US006758467B2

(12) United States Patent
Kitaura

(10) Patent No.: US 6,758,467 B2
(45) Date of Patent: Jul. 6, 2004

(54) WORK FIXING CLAMP SYSTEM

(75) Inventor: Ichiro Kitaura, Itami (JP)

(73) Assignee: Pascal Engineering Corporation, Hyogo (JP)

( * ) Notice: Subject to any disclaimer, the term of this patent is extended or adjusted under 35 U.S.C. 154(b) by 229 days.

(21) Appl. No.: 09/936,501

(22) PCT Filed: Jan. 15, 2001

(86) PCT No.: PCT/JP01/00206

§ 371 (c)(1), (2), (4) Date: Jan. 14, 2002

(87) PCT Pub. No.: WO01/53035

PCT Pub. Date: Jul. 26, 2001

(65) Prior Publication Data

US 2003/0094741 A1 May 22, 2003

(30) Foreign Application Priority Data

Jan. 17, 2000 (JP) ....................................... 2000-010319

(51) Int. Cl.$^7$ .................................................. B23Q 3/00
(52) U.S. Cl. ............................................ 269/20; 269/24
(58) Field of Search ............................. 269/20, 21, 24, 269/32, 27

(56) References Cited

U.S. PATENT DOCUMENTS 4,620,695 A * 11/1986 Vanistendael ................ 269/24
5,161,788 A * 11/1992 Guzzoni ...................... 269/24
5,192,058 A * 3/1993 VanDalsem et al. .......... 269/24
5,695,177 A * 12/1997 Mascola ...................... 269/24
5,836,573 A * 11/1998 Hayashi et al. ............... 269/20
6,149,358 A * 11/2000 Montague ................... 409/225
6,299,151 B1 * 10/2001 Smith .......................... 269/32

FOREIGN PATENT DOCUMENTS

JP 61-109639 A1 5/1986
JP 3-234434 A1 10/1991
JP 4-60772 B2 9/1992
JP 5-25792 6/1993
JP 2549621 9/1997
JP 10-109239 A1 4/1998
JP 11-170133 A1 6/1999

* cited by examiner

*Primary Examiner*—Lee D. Wilson
(74) *Attorney, Agent, or Firm*—Darby & Darby

(57) ABSTRACT

A clamp system includes a plurality of clamping devices arrayed along at least a first hydraulic supply loop and a plurality of support devices arrayed along at least a second hydraulic supply loop. The clamping devices may include vertical rotating clamping devices which rotate vertically to secure a workpiece to a base plate. The clamping devices may also include horizontally rotating clamping devices which rotate axially and extend vertically to clamp the workpiece. The support devices support and stabilize the workpiece during machining operations. The first and second hydraulic supply loops are interconnected and allow the clamping devices to clamp the workpiece before the support pieces support the workpiece. The second hydraulic supply loop boosts support to and locks the support devices for additional stability.

27 Claims, 14 Drawing Sheets

WORK FIXING CLAMP SYSTEM

BACKGROUND OF THE INVENTION

1. Field of the Invention

The present invention relates to a clamp system which employs a plurality hydraulic clamps to removably secure a workpiece to a base plate. More specifically, the present invention relates to a main cylinder unit in each hydraulic clamp supplied through wall-based hydraulic pathways.

2. Description of the Related Art

Referring now to FIG. 12, standard clamp system includes a plurality of clamp devices 210 to secure a workpiece Wa to a base plate 200. During operation, clamp devices 210 operate through hydraulic pressure to engage and disengage workpiece Wa. During normal engagement, workpiece Wa solidly engages base plate 200 for machining.

On a left-hand side of FIG. 12, a pair of bolts 217 secures a main cylinder unit 211 in an attachment hole 201 of base plate 200. An output member 212 extends from main cylinder unit 211 and secures workpiece Wa to base plate 200.

Output member 212 includes a piston rod 213 and an arm 214. Piston rod 213 extends away from main cylinder unit 211 and base plate 200. Arm 214 extends perpendicularly from main cylinder unit 211 and engages workpiece Wa. Arm 214 is pivotable about main cylinder unit 211 to allow easy positioning of workpiece Wa.

A guide 215 forms a rod-side cylinder end wall on main cylinder unit 211 and guides piston rod 213 during operation. A hydraulic pipe 216 joins a hydraulic hose (not shown) to main cylinder unit 211.

During operation, hydraulic pipe 216 supplies hydraulic pressure from the hydraulic pressure supply device (not shown) to main cylinder unit 211. As hydraulic pressure in main cylinder unit 211 increases, piston rod 213 lowers. As piston rod 213 lowers, arm 214 presses a clamping point (not shown) on workpiece Wa onto a receiving base 202 and base plate 200.

On a right-hand side of FIG. 12, a pair of bolts 219 secures a second clamping device 210 to base plate 200. A spacer base plate 218 spaces the right-hand side main cylinder unit 211 away from base plate 200. During adjustment, replacement spacer base plates 218 may be used to adjust the clamping height ranges for differently shaped workpiece Wa.

Clamping devices 210 operate as horizontally pivoting clamps which allow arms 214 to pivot in a tandem with operation of piston rods 213 to allow easy placement of workpiece Wa. Unfortunately, clamping devices of this design have several undesirable features. First, hydraulic pipe 216 is easily damaged causing undesirably downtime and loss in production efficiency. Second, guide members 215 require a larger base plate 200 and reduce machining efficiency. Third, where hydraulic pipes 216 are damaged, clamping force may be unexpectedly reduced causing operator injury. Fourth, since each clamping device 210 requires an individual hydraulic pipe 216 complexity and costs are increased.

Referring now to FIG. 13, in a second clamp system, a main cylinder unit 221 of a clamp device 220 fits inside a base plate 230. A flange 222 on clamp device 220 serves as a guide member and abuts an upper surface of base plate 230.

A horizontal oil path 232 and a vertical oil path 231 link a hydraulic port 232 to a hydraulic pressure supply device (not shown). Horizontal oil path 232 and vertical oil path 231 are inside base plate 230. Base plate 230 operates to protect horizontal and vertical oil paths 232, 231. Unfortunately, it is difficult to produce secure, clean, and effective internal oil passageways, thereby increasing manufacturing costs and reducing reliability.

Referring additionally to FIG. 14, in a third clamp system, a single spacer 225 spaces main cylinder unit 221 from a base plate 235 and accommodates differently shaped workpieces Wa.

Spacer 225 includes an oil path 226. Oil path 226 joins hydraulic port 223 of main cylinder unit 221 to a hydraulic port 227. Hydraulic port 227 is on a bottom end of oil path 226 and spacer 225. A hydraulic pipe 236 extends from the hydraulic pressure supply device (not shown) to base plate 235. A connected oil path 237 extends continuously from hydraulic pipe 236 to hydraulic port 223. Connected oil path 237 supplies hydraulic pressure from the hydraulic pressure supply device to main cylinder unit 221.

As noted above, with the above design it is difficult to produce secure, clean, and effective internal oil passageways, thereby increasing manufacturing costs and reducing reliability.

Referring additionally to FIG. 15, a fourth clamp system includes a pair of spacers 225 separating main cylinder unit 221 from a base plate 240. Oil paths 226 in spacers 225 are aligned with a vertical oil path 241. Oil path 241 and a horizontal oil path 242 transport hydraulic pressure from the hydraulic pressure supply device through oil paths 226 to main cylinder unit 221.

In each clamp system described above, single or multiple spacers 218,225 adjust the height at which arms 214 of main cylinder units 220 clamp workpieces Wa. Unfortunately, each change in workpiece Wa size, requires disassembly, alignment of the multiple oil pathways, and secure reassembly. Such disassembly-alignment-reassembly actions increase production time, risk equipment damage, and increase the probability of hydraulic leaks.

As noted above, it is unfortunately also difficult to produce secure, clean, and effective internal oil passageways, thereby increasing manufacturing costs and reducing reliability.

Referring to FIGS. 16 and 17, a plurality of clamp devices 250 are disposed along an edge of a base plate 260. A pair of hydraulic ports 252, 253 are at a bottom end of a flange 251 on each clamp device 250.

A plurality of clamping oil paths 261 supply hydraulic pressure from an external supply device (not shown) to each hydraulic port 252 on each respective clamp device 250. Clamping oil paths 261 are inside base plate 260.

A plurality of unclamping oil paths supply 265 return hydraulic pressure to the external supply device from each hydraulic port 253 of each respective clamp device 250. Unclamping oil paths 265 are inside base plate 260.

Shared oil paths 262, 266 extend linearly inside base plate 260 a direction parallel to the plurality of clamping devices 250. Clamping oil path 261 includes shared oil path 262. Unclamping oil path 265 includes shared oil path 266.

A plurality of horizontal oil paths 263 extends toward each respective clamp device 250 from shared oil path 262. A plurality of horizontal oil paths 267 extends toward each respective clamp device 250 from shared oil path 266.

A plurality of perpendicular oil paths 264 connects each oil path 263 to each respective hydraulic port ports 252. A plurality of perpendicular oil paths 267 connects each oil path 267 to each respective hydraulic port 253.

During operation it is desirable for base plate 260 to have both compact dimensions and sufficient strength and rigidity to secure workpieces Wa of a predetermined size. It is also desirable to maximize available work surface on each base plate 260. By maximizing the available work surface and minimizing the dimensions of base plate 260, multiple operations may be performed at a single work station. The more compact base plate 260, the more compact a machining tool (restricted by the mounting zone of the base plate) may be for each workpiece Wa. Unfortunately, multiple hydraulic pipes reduce a base plate to workpiece ration and increase costs.

Unfortunately, with the design described above, production costs are high since clamping and unclamping oil paths 261, 265 are difficult to produce. This difficulty in manufacture also increases production failure rates and reduces quality.

For each design described above, the plurality of hydraulic pipes restricts movement when transporting each respective base plate and increases production time.

Finally, when piston rods 213 extend they are exposed to machining debris and damage, and the guiding ability of the design is not adequate and elastic deformation tends to occur.

OBJECTS AND SUMMARY OF THE INVENTION

An object of the present invention is to provide a clamping system that overcomes the problems described above.

It is another object of the present invention to provide a clamping system where oil pathways are simplified and easily, quickly, and cheaply manufactured.

It is another object of the present invention to provide a clamping system where piston rods receive adequate guidance and protection during operation.

It is another object of the present invention to increase an available work area on the base plate.

It is another object of the present invention to provide sufficient support to a workpiece on the base plate to resist downward movement during machining.

The present invention relates to a clamp system including a plurality of clamping devices arrayed along at least a first hydraulic supply loop and a plurality of support devices arrayed along at least a second hydraulic supply loop. The clamping devices may include vertical rotating clamping devices which rotate vertically to secure a workpiece to a base plate. The clamping devices may also include horizontally rotating clamping devices which rotate axially and extend vertically to clamp the workpiece. The support devices support and stabilize the workpiece during machining operations. The first and second hydraulic supply loops are interconnected and allow the clamping devices to clamp the workpiece before the support pieces support the workpiece. The second hydraulic supply loop boosts support to and locks the support devices for additional stability.

According to an embodiment of the present invention there is provided a clamp system, for disengageably securing a workpiece using a plurality of hydraulic clamp devices, a clamp system wherein: a thick base plate is disposed to allow mounting of said plurality of clamp devices, each of said hydraulic clamp devices including a main cylinder unit disposed in a wall of said base plate and oriented along a thickness axis of said base plate, an output member including a piston rod extending from said main cylinder unit toward a surface of said base plate, a guide member disengageably secured to said surface of said base plate and guiding said piston rod to allow a forward and a back motion, said guide member covering a major portion of said piston rod projecting out from said surface and not obstructing a clamping operation of said output member, a rod-side cylinder end wall of said main cylinder unit disengageably secured to said base plate, and a first oil path formed in said wall of said base plate to supply a hydraulic pressure from a hydraulic pressure supplying means to each said main cylinder unit of said plurality of clamp devices.

According to another embodiment of the present invention there is further provided a clamp system, for securing a workpiece, wherein: said workpiece, clamped by said plurality of clamp devices, is supported from said base plate by a plurality of support devices, each of said support devices including a second main cylinder unit disposed in said wall of said base plate and oriented along a thickness axis of said base plate, a support member including a second piston rod extending from said main cylinder unit toward said surface of said base plate, and a second oil path formed in said wall of base plate to supply said hydraulic pressure from said hydraulic pressure supplying means to said second main cylinder units of said plurality of support devices.

According to another embodiment of the present invention there is further provided a clamp system, for securing a workpiece, wherein: a hydraulic pressure booster means disposed on said base plate is effective to increase said hydraulic pressure received from said hydraulic pressure supplying means and supplying said increased hydraulic pressure to said plurality of support devices via said second oil path.

According to an embodiment of the present invention there is provided a clamp system, for disengageably securing a workpiece to a base plate, comprising: a plurality of clamping members on said base plate; said plurality of clamping members effective to hydraulically and securely clamp said workpiece to said base plate during an external operation; a plurality of support members on said base plate; said plurality of support members effective to hydraulically and securely support said workpiece on said base plate during said external operation; hydraulic pressure means for supplying at least a first hydraulic pressure to said plurality of clamping members and to said plurality of support members to enable respective clamping and supporting of said workpiece; and hydraulic booster means for boosting said at least first hydraulic pressure to a boosted hydraulic pressure, and for supplying said boosted hydraulic pressure to and locking said plurality of support members, whereby said clamping system easily and securely clamps and supports said workpiece and allows speedy removal for later processing.

According to another embodiment of the present invention there is provided a clamp system, wherein: said plurality of clamping members includes at least one vertically pivoting hydraulic clamp device.

According to another embodiment of the present invention there is provided a clamp system, wherein: said hydraulic pressure means includes at least first oil path means for supplying said first hydraulic pressure downstream to said plurality of support members.

According to another embodiment of the present invention there is provided a clamp system, wherein: said hydraulic booster means includes at least second oil path means for suppling said boosted hydraulic pressure downstream to said plurality of said support members; and said hydraulic booster means effective to boost said at least first hydraulic pressure to said boosted hydraulic pressure after said workpiece is securely clamped to said base plate at said first hydraulic pressure, whereby said support members will not shift said workpiece upon application of said boosted hydraulic pressure.

According to another embodiment of the present invention there is provided a clamp system, wherein: said first oil path means for supplying is in said base plate; and said second oil path means for supplying is in said base plate, wherein said base plate provides easy protection for said first oil path means and said second oil path means and minimizes damage to said hydraulic pressure means and said hydraulic booster means during said external operation.

According to another embodiment of the present invention there is provided a clamp system, wherein: said first oil path means for supplying supplies said first hydraulic pressure downstream to said plurality of support members along a series hydraulic circuit.

According to another embodiment of the present invention there is provided a clamp system, wherein: said second oil path means for supplying supplies said boosted hydraulic pressure along a parallel hydraulic circuit.

According to another embodiment of the present invention there is provided a clamp system, wherein: said plurality of clamping members including at least one horizontally pivoting hydraulic clamp device; and said at one vertically pivoting hydraulic clamp device operable in tandem with said at least one horizontally pivoting hydraulic clamp device upon receiving said first hydraulic pressure from said hydraulic pressure means for supplying.

According to another embodiment of the present invention there is provided a clamp system, further comprising: a main cylinder unit in said vertically pivoting hydraulic clamp device; said main cylinder unit extending perpendicular to said base plate; a piston rod in said main cylinder unit; said piston rod extending away from said main cylinder unit when said main cylinder unit receives said first hydraulic pressure in a clamping direction and retracting toward said main cylinder unit when said main cylinder unit receives said first hydraulic pressure in an unclamping direction; a guide member on said main cylinder unit; said guide member disengageably fixed to an upper surface of said base plate; and said guide member effective to support said piston rod during said extending and said retracting whereby said guide member protects said piston rod from damage and debris during said external operation.

According to another embodiment of the present invention there is provided a clamp system, further comprising: a rod-side cylinder end wall on main cylinder unit; said rod-side cylinder end wall integral with guide member; said piston rod on an output member; a pivot arm on said output member; said pivot arm is pivotably supported on a first end of said piston rod; said pivot arm effective to securely clamp said workpiece to said baseplate during said clamping; a pivot linking mechanism rotatively linking said pivot arm and said guide member; a pivot linking member in said pivot linking mechanism; and said pivot linking mechanism vertically pivoting said pivot arm in tandem with said extending and said retracting of said piston rod, whereby said pivot linking mechanism and said pivot arm transmit said first hydraulic force and securely clamp an speedily unclamp said workpiece.

According to another embodiment of the present invention there is provided a clamp system, further comprising: a second main cylinder unit in said horizontally pivoting hydraulic clamp device; said second main cylinder unit extending perpendicular to said base plate; a second piston rod in said second main cylinder unit; said second piston rod extending away from said second main cylinder unit when said second main cylinder unit receives said first hydraulic pressure in said unclamping direction and retracting toward said second main cylinder unit when said second main cylinder unit receives said first hydraulic pressure in said clamping direction; a second guide member on said second main cylinder unit; said second guide member disengageably fixed to an upper surface of said base plate; and said second guide member effective to support said second piston rod during said extending and said retracting whereby said second guide member protects said second piston rod from damage and debris during said external operation.

According to another embodiment of the present invention there is provided a clamp system, further comprising: a second rod-side cylinder end wall on second main cylinder unit; said second rod-side cylinder end wall integral with second guide member; said second piston rod on a second output member; a second pivot arm on said second output member; said second pivot arm fixably extending from a first end of said second piston rod perpendicular to said second piston rod; said second pivot arm effective to securely clamp said workpiece to said baseplate during said clamping; a pivoting mechanism rotatably and extendably linking said second piston rod and said second main cylinder unit; and said pivoting mechanism effective to vertically extend, retract, and pivot said second pivot arm in tandem with said extending and said retracting of said second piston rod, whereby said pivoting linking mechanism transmits said first hydraulic force and securely clamp an speedily unclamps said workpiece.

According to another embodiment of the present invention there is provided a clamp system, further comprising: at least a rod member in said pivoting mechanism; at least a head-side cylinder end wall in said second main cylinder unit; said rod member fixably linked at a top side inside a lower section of said second piston rod; said rod member slidably and rotatably linked at a bottom side to said head-side cylinder end wall; said rod member including a plurality of helical grooves along an outer circumference of said rod member; said plurality of helical grooves traveling in an arc about said outer circumference; said arc between seventy-five and up to ninety degree (75°–90°); a support member on an upper side of said head-side cylinder end wall; a plurality of balls rotatably supported and retained in support member; and said plurality of balls engaging respectively each said plurality of helical grooves, whereby when said second piston rod extends and retracts, said rod member rotatably guides said second piston rod and said second pivot arm through said arc to speedily engage and disengage said workpiece.

According to another embodiment of the present invention there is provided a clamp system, wherein: said arc is between ninety and up to one hundred and five degrees (90°–105°).

According to another embodiment of the present invention there is provided a clamp system, wherein: said plurality of support members includes at least a first vertical support device; a third main cylinder unit in said first vertical support device; said third main cylinder unit extending perpendicular to said base plate; a cylinder cap in said main cylinder unit; a head-side cylinder end wall secured to said cylinder cap; said cylinder cap and said head-side cylinder end wall securing said third main cylinder unit in said base plate; a support member in said vertical support device; said support member extends perpendicular to said base plate and away from said main cylinder unit; a third piston rod in said support member; a support rod extending from an upper end of said third piston rod; said third main cylinder unit effective to receive said first hydraulic pressure as at least one of a first support pressure and a first unsupporting pressure and respectively extending and retracting said third piston rod according to said first hydraulic pressure; a third guide member extending away from said base plate; said third guide member guidably surrounding and supporting said support member during said extension and said retraction, thereby protecting said support member from debris and damage; and means for receiving said boosted hydraulic pressure from said hydraulic booster means and releasably locking said support member against said workpiece relative to said third main cylinder, whereby said workpiece is supported at a pressure greater than said first hydraulic pressure.

According to another embodiment of the present invention there is provided a clamp system, for disengageably securing a workpiece to a base plate, comprising: a plurality of clamping members on said base plate; said plurality of clamping members effective to hydraulically clamp said workpiece to said base plate; a plurality of support members on said base plate; said plurality of support members effective to hydraulically support said workpiece on said base plate; hydraulic pressure means for supplying at least a first hydraulic pressure to each said clamping member and to each said support member; and hydraulic booster means for boosting said at least first hydraulic pressure to a boosted hydraulic pressure, and for supplying said boosted hydraulic pressure to and locking said plurality of support members, whereby said clamping system easily and securely clamps and supports said workpiece and allows speedy removal for later processing.

According to another embodiment of the present invention there is provided a clamp system, wherein: said plurality of clamping members are vertically pivoting hydraulic clamp devices.

According to another embodiment of the present invention there is provided a clamp system, wherein: said plurality of clamping members are horizontally pivoting hydraulic clamp devices.

According to another embodiment of the present invention there is provided a clamp system, for disengageably securing a workpiece to a base plate, comprising: a plurality of clamping members on said base plate; said plurality of clamping members effective to hydraulically and securely clamp said workpiece to said base plate during an external operation; said plurality of clamping members including at least one vertically pivoting hydraulic clamp device; a plurality of support members on said base plate; said plurality of support members effective to hydraulically and securely support said workpiece on said base plate during said external operation; hydraulic pressure means for supplying at least a first hydraulic pressure to said plurality of clamping members and to said plurality of support members; and hydraulic booster means for boosting said at least first hydraulic pressure to a boosted hydraulic pressure, and for supplying said boosted hydraulic pressure to and locking said plurality of support members, whereby said clamping system easily and securely clamps and supports said workpiece and allows speedy removal for later processing.

According to another embodiment of the present invention, there is provided a clamp system, for disengageably securing a workpiece to a base plate, comprising: a plurality of clamping members on said base plate; said plurality of clamping members effective to hydraulically and securely clamp said workpiece to said base plate during an external operation; said plurality of clamping members including at least one vertically pivoting hydraulic clamp device and at least one horizontally pivoting hydraulic clamp device; a plurality of support members on said base plate; said plurality of support members effective to hydraulically and securely support said workpiece on said base plate during said external operation; hydraulic pressure means for supplying at least a first hydraulic pressure to said plurality of clamping members and to said plurality of support members; and hydraulic booster means for boosting said at least first hydraulic pressure to a boosted hydraulic pressure, and for supplying said boosted hydraulic pressure to and locking said plurality of support members, whereby said clamping system easily and securely clamps and supports said workpiece and allows speedy removal for later processing.

According to another embodiment for the present invention there is provided a clamp system, for disengageably securing a workpiece to a base plate using a plurality of hydraulic clamp devices, comprising: said plurality of hydraulic clamp devices on said base plate; at least a main cylinder unit in each said hydraulic clamp device; said main cylinder unit disposed in a wall of said base plate; said main cylinder unit oriented along a first thickness axis of said base plate; at least an output member in each said hydraulic clamp device; a piston rod in each said output member extending away from said main cylinder unit; a guide member disengageably secured to a surface of said base plate; said guide member effective to guide said piston rod during an extension and a retraction; said guide member covering at least have of said piston rod projecting away from said surface of said base plate; a rod-side cylinder end wall on said main cylinder unit; hydraulic pressure supplying means for supplying at least a first hydraulic pressure to said main cylinder units; said rod-side cylinder mend wall disengageably secured to said base plate; and at least a first oil path in a wall of said base plate effective supply said first hydraulic pressure from hydraulic pressure supplying means to said main cylinder units, whereby said plurality of clamp devices securely clamp said workpiece to said base plate.

According to another embodiment of the present invention there is provided a clamp system, further comprising: a plurality of support devices; said plurality of support devices extending away from said base plate; said plurality of support devices effective to support an external clamped workpiece away from said base plate during an external operation; each said support device including a second main cylinder unit; said second main cylinder unit disposed in said wall of said base plate; said second main cylinder unit oriented along said thickness axis of said base plate; a second support member in each said plurality of support devices; said second support member including a second piston rod; said second piston rod extending from said second main cylinder unit away from said base plate; a second oil path in said base plate; and said second oil path supplying said first hydraulic pressure from said hydraulic pressure supplying means to each said second main cylinder units of said plurality of support devices.

According to another embodiment of the present invention there is provided a clamp system, further comprising: means for boosting said first hydraulic pressure received said hydraulic pressure supplying means to a second hydraulic pressure; said means for boosting on said base plate; said means for boosting increasing including means for supplying said second hydraulic pressure to said plurality of support devices, whereby said plurality of support devices provide increased support to said workpiece.

According to another embodiment of the present invention there is provided a clamp system, wherein: said means for boosting includes at least a second oil path; said second oil path effective to transport said second hydraulic pressure to said plurality of support devices.

According to another embodiment of the present invention there is provided a clamp system, wherein: said plurality of hydraulic clamp devices includes at least one horizontally pivoting hydraulic clamp device; a pivoting mechanism in said horizontally pivoting hydraulic clamp device; and said pivoting mechanism effective to pivot said piston rod an a horizontal clearance arc in tandem with a clamping and an unclamping action of said horizontally pivoting clamp device, whereby said workpiece is speedily clamped to said baseplate.

According to another embodiment of the present invention there is provided a clamp system, wherein: said plurality of hydraulic clamp devices includes at least one vertically pivoting hydraulic clamp device; said vertically pivoting hydraulic clamp device includes at least an output member; said output member includes a pivot arm having a pivotably supported pivot point; a pivot point link member operably joined to said guide member; a pivot point link member supporting said pivot point and said pivot arm; and said pivot point link member and said output ember effective to vertically pivot said output member relative to said base plate in tandem with a clamping and unclamping action of said vertically pivoting hydraulic clamp device, whereby said workpiece is speedily clamped to said baseplate.

According to another embodiment of the present invention there is provided a clamp system, wherein: said at least first oil path includes a first oil path section joining said at least main cylinder units to said hydraulic pressure supplying means; said first oil path section parallel to a surface of said base plate.

According to another embodiment of the present invention there is provided a clamp system, wherein: said at least first oil path includes at least a first clamping path and a first unclamping path; said first clamping path effective to supply said first clamping pressure to each said main cylinder unit during a clamping operation; said first unclamping path effective to release said first clamping pressure from each said main cylinder unit during an unclamping operation, and said first clamping path and said first unclamping path are parallel to each other and separated along an axis perpendicular to a face of said base plate, whereby said plurality of hydraulic clamping devices is easily and simply clamped and unclaimed and said clamping system is simplified to minimize component damage.

The present invention provides a clamp system for disengageably securing a workpiece using a plurality of hydraulic clamp devices. A thick base plate is disposed to allow the plurality of clamp devices to be mounted. Each of the hydraulic clamp devices includes a main cylinder unit disposed in a wall of the base plate and oriented along a thickness axis of the base plate; an output member including a piston rod extending from the main cylinder unit toward a surface of the base plate; a guide member disengageably secured to the surface of the base plate and guiding the piston rod to allow forward and back motion, the guide member covering a major portion of the piston rod projecting out from the base plate surface while not obstructing clamping operations of the output member; a rod-side cylinder end wall of the main cylinder unit disengageably secured to the base plate. A first oil path is formed in the wall of the base plate to supply hydraulic pressure from hydraulic pressure supplying means to the main cylinder units of the plurality of clamp devices.

After opening, the output members of the plurality of clamp devices are put in a standby state and the workpiece is mounted on the base plate. Once the workpiece is mounted on the base plate and aligned to a predetermined position, hydraulic pressure is sent from hydraulic pressure supplying means to the main cylinder units of the plurality of clamp devices via the first oil path formed in the wall of the base plate. This drives the piston rods of the clamp devices, and the workpiece is pressed against and secured to the base plate by the plurality of output members including the piston rods.

The guide member, which covers the majority of the portion of the piston rod projecting out from the base plate surface while not obstructing the clamping action of the output member, guides the piston rod so that it can move back and forth and allows the output member to reliably press and clamp the workpiece against the base plate. Since the guide member covers the majority of the projected portion of the piston rod, elastic deformation of the piston rod during the clamped state is prevented and deformation of the workpiece is prevented. Furthermore, the piston rod is protected from external dust such as debris from machining.

The guide member and the rod-side cylinder end wall of the main cylinder unit are disengageably secured to the base plate. The guide member and the rod-side cylinder end wall of the main cylinder unit can be disengaged and replaced with other piston rods and guide members. Thus, for each clamp device, a guide member and a piston rod having the length (height) appropriate for the clamping position based on the shape and size of the workpiece can be provided, thus allowing adjustments to be made easily.

In particular, the main cylinder units of the clamp devices are mounted in the wall of the base plate along the thickness axis of the base plate. The first oil paths supplying hydraulic pressure from the hydraulic pressure supply device to the main cylinder units of the plurality of clamp devices are formed inside the wall of the base plate. As a result, the wall of the base plate can be used effectively as a section of the main cylinder unit. Also, the structure of the oil paths supplying hydraulic pressure to the plurality of clamp devices can be simplified, and the design and processing operations can be simplified.

The hydraulic port of the main cylinder unit can be formed in the wall of the base plate parallel to the base plate, and the first oil path can be connected to the main cylinder unit using a simple oil path that is parallel to the base plate. This eliminates the need to form oil paths in the base plate, the main cylinder unit, and the guide member that are oriented along the thickness axis of the guide member. Thus, the structure of the oil paths supplying hydraulic pressure to the plurality of clamp devices can be made simple.

If the clamp devices are to be disposed at the edges of the base plate, there is no need to form the first oil path further out toward the edge than the clamp device. This eliminates the need for the corresponding space. Since there is no need to connect hydraulic pipes to the guide member, the guide member can be made more compact. As a result, the required area (i.e., the planar size) of the base plate can be made as compact as possible and the work area ratio on the upper surface of the base plate can be increased.

A plurality of support devices can be disposed to support the workpiece, which is clamped by the plurality of clamp devices, onto the base plate from behind. In this case, the support devices include: a main cylinder unit disposed inside the wall of the base plate along the thickness axis of the base plate; and a support member including a piston rod extending toward the surface of the base plate from the main cylinder unit. A second oil path is formed in the wall of the base plate to supply hydraulic pressure from hydraulic pressure supplying means to the main cylinder units of the plurality of support devices.

In this case, after clamping the workpiece to the base plate with the plurality of clamp devices, the piston rods of the support devices are projected and the ends of the support members are abutted against the support points of the workpiece. Then, the support members are locked to prevent them from moving forward or back and this state is maintained. By using the plurality of support devices to simply and reliably support the workpiece, which is clamped by the plurality of clamp devices, against the base plate from behind, flexure, vibration, and the like of the workpiece during machining can be prevented and processing precision can be improved.

Furthermore, the wall as the base plate can be used effectively as part of the main cylinder unit. Also, the structure of the oil paths supplying hydraulic pressure to the main cylinder units of the plurality of support devices can be simplified.

Furthermore, a hydraulic pressure booster can be disposed on the base plate to increase the hydraulic pressure received from hydraulic pressure supplying means and supplying the pressure to the plurality of support devices via the second oil path. In this case, hydraulic pipes for supplying the hydraulic pressure from the hydraulic pressure booster can be eliminated, thus simplifying the structure and reducing production costs.

The main cylinder unit of the hydraulic pressure booster can also be disposed in the wall of the base plate. In this case, a section of the base plate can be used effectively as a section of the main cylinder unit. This simplifies the structure of the hydraulic pressure booster and allows the base plate to be a structure that can be easily transported. Also, the structure of the oil paths supplying hydraulic pressure to the support device from the hydraulic pressure booster can be simplified.

In the hydraulic clamp device described above, a pivoting mechanism may be disposed on the main cylinder unit so that the piston rod is pivoted back and forth approximately 90 degrees in tandem with the action of the piston rod. In this case, the output member can be pivoted 90 degrees from the clamping position when mounting the workpiece to the base plate or when moving the base plate so that the output member, including the piston rod, does not get in the way.

Also, the hydraulic clamp device can include a pivot arm with an output member pivotably supported at a pivot point. A support link member supporting this pivot point is connected to the guide member. In this case, the pivot arm can be pivoted from the clamp position when mounting the workpiece to the base plate or moving it from the base plate so that the output member does not get in the way of the pivot arm.

In the first oil path described above, the oil path section connected to the main cylinder unit of the hydraulic clamp device can be formed parallel to the surface of the base plate. Thus, a majority of the first oil path including this oil path section can be formed parallel to the surface of the base plate. This simplifies the structure of the first oil path and simplifies design and processing. The plurality of hydraulic clamp devices can be connected in series via the first oil path, and, in this case, the structure of the first oil path can be made even more simple.

Also, in the first oil paths, the oil path sections connecting at least the main cylinder units of the hydraulic clamp devices of the same type can be formed parallel to the surface of the base plate. Since a majority of the first oil path can be formed parallel to the surface, the structure of the first oil path can be simplified and design and processing can be simplified. Furthermore, if the hydraulic clamp device is disposed near the edge of the base plate, the space required for forming the first oil path at the edge of the base plate for the clamp device is not needed, allowing the base plate to be made more compact and allowing the work area ratio to be increased. The plurality of hydraulic clamp devices can be connected in series via the first oil path, and this can further simplify the structure of the first oil path.

The first oil path includes: a clamping oil path for clamping the plurality of clamp devices; and an unclamping oil path for releasing the clamped state of the plurality of clamp devices. These clamping oil paths and unclamping oil paths can be arranged separated from each other along the axis perpendicular to the surface of the base plate. The space along the axis parallel to the surface of the base plate used to form the first oil path can be made compact.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

In the following description, references to up/down/left/right will be based on the directions relative to FIG. 1.

Figure 1:
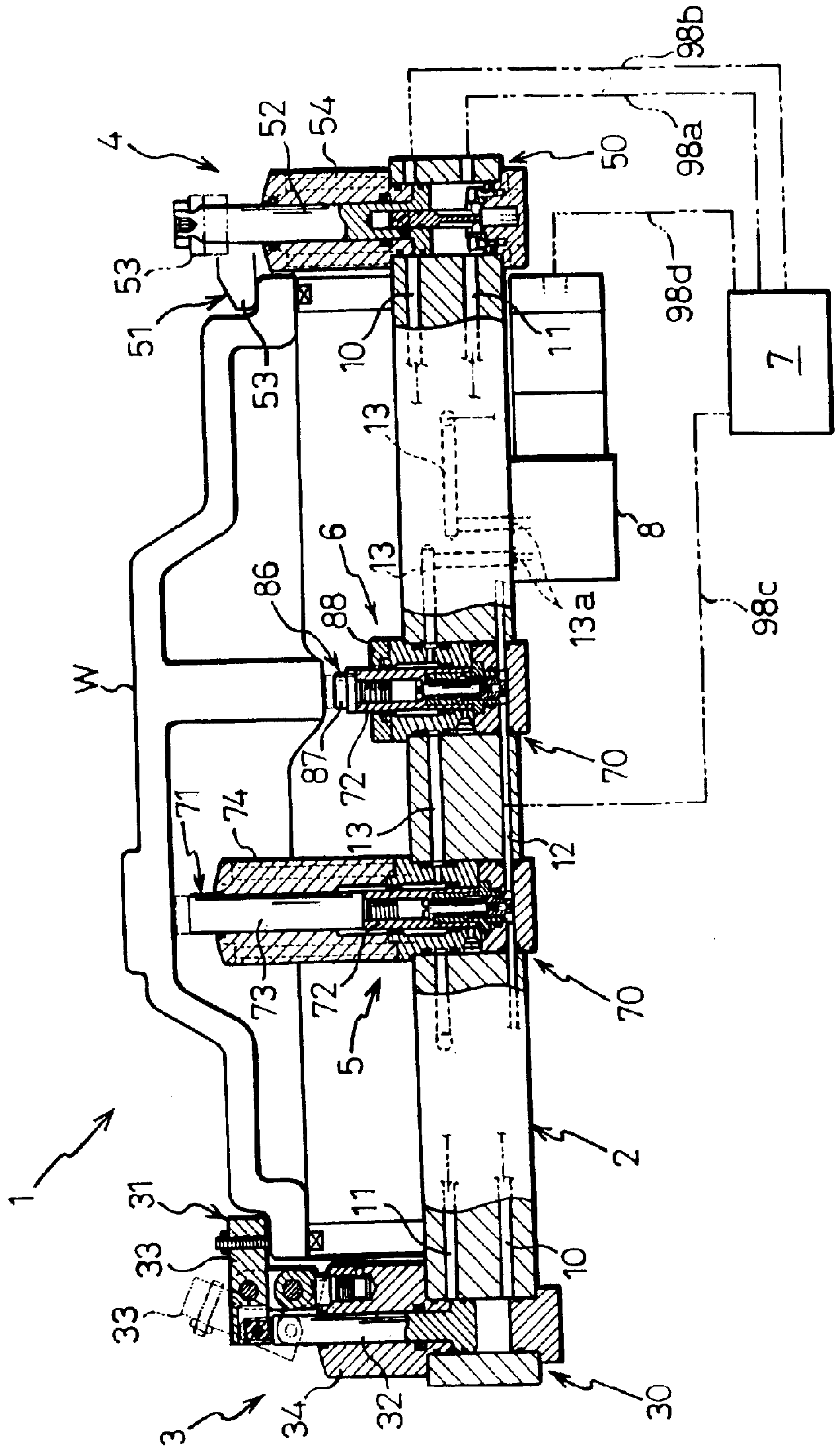
FIG. 1 is a partial cross-section of a clamp system according to the present invention.
Figure 2:
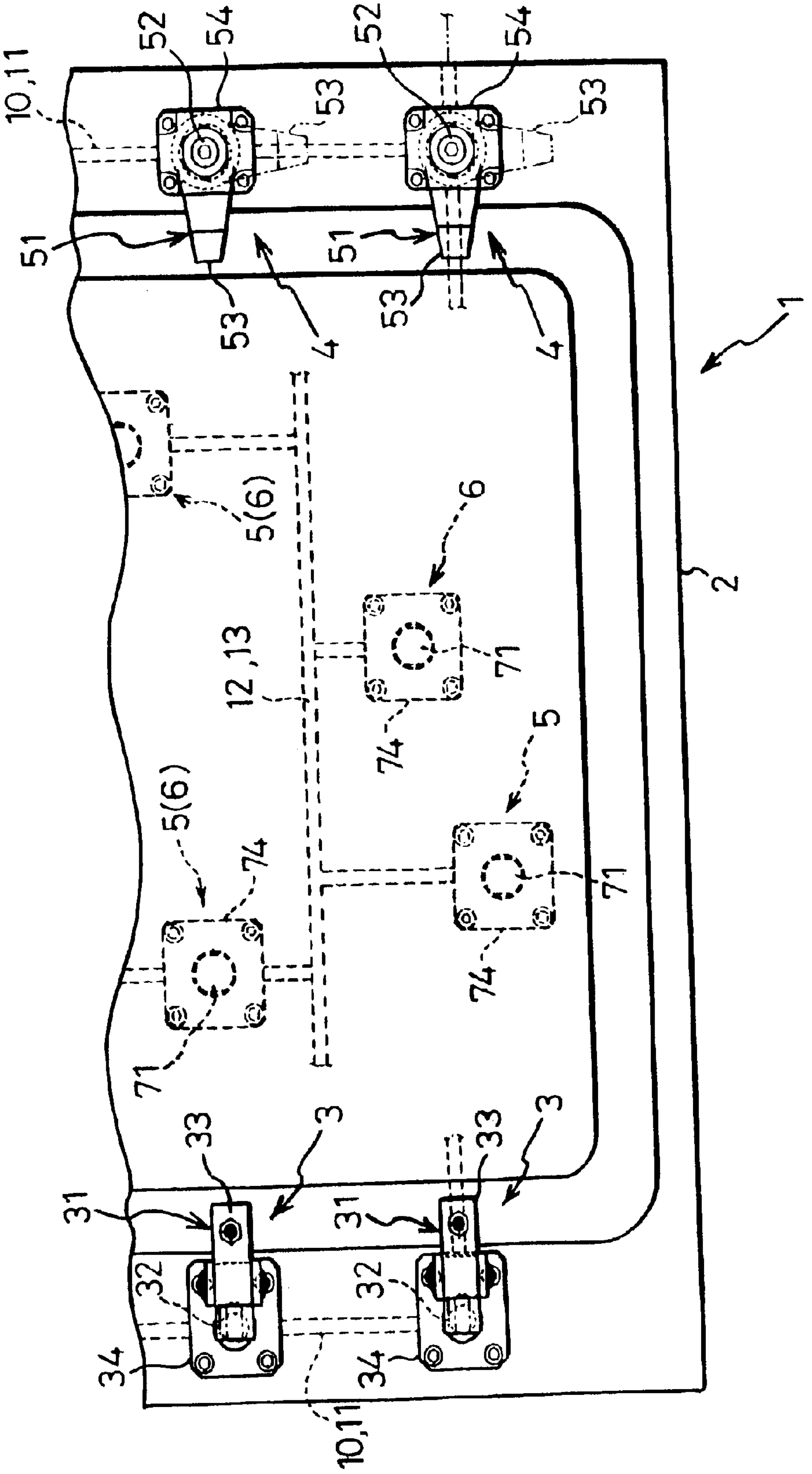
FIG. 2 is a plan view of the main elements of the clamp system in FIG. 1.

Referring now to FIGS. 1 and 2, a workpiece-securing clamp system 1 [hereinafter referred to as the clamp system 1] includes a base plate 2 having a predetermined thickness effective for supporting a workpiece W.

A plurality of hydraulic clamp devices 3 are on a first side of base plate 2. A plurality of hydraulic clamp device 4 are on a second side of base plate 2 opposite hydraulic clamp devices 3. During operation, the plurality of hydraulic clamp devices 3, 4 operate to secure workpiece W to base plate 2.

Hydraulic clamp devices 3 are vertically pivotable relative to base plate 2. Hydraulic clamp devices 4 are horizontally pivotable relative to base plate 2. In combination, hydraulic clamp devices 3, 4 are rapidly adaptable to unusually shaped workpieces W.

A plurality of support devices 5, 6, mounted on base plate 2 operate to support workpiece W during operation, as will be described. A hydraulic pressure supply device 7 connects with and supplies hydraulic pressure to clamp devices 3, 4 and plurality of support devices 5, 6, as will be explained. Hydraulic pressure supply device 7 normally supplies an average hydraulic pressure range of 7 MPa. A hydraulic pressure booster 8 links with hydraulic pressure supply device 7. Hydraulic pressure booster 8 operates in conjunction with hydraulic pressure supply device 7 and increases the average pressure supply range to approximately 25 Mpa for support devices 5, 6. During operation, hydraulic pressure applied to workpiece W is adjustable through operation of hydraulic pressure supply device 7 and hydraulic pressure booster 8.

Each hydraulic clamp device 3 includes a main cylinder unit 30. Each hydraulic clamp device 4 includes a main cylinder unit 50. Each support device 5, 6 includes a main cylinder unit 70. The walls of base plate 2 constitute main cylinder units 30, 50, and 70 vertically relative to a thickness axis in positions selected to support workpiece W.

A plurality of clamping oil paths 10 connect hydraulic pressure supply device 7 to each main cylinder unit 30, 50. A plurality of unclamping oil paths 11 connect each main cylinder unit 30, 50 to hydraulic pressure supply device 7. During clamping operations, hydraulic clamping pressure passes through clamping oil paths 10 and clamps main cylinder units 30, 50. During unclamping operations, hydraulic pressure releases through unclamping oil paths 11 and unclamp main units 30, 50. Clamping oil paths 10 and unclamping oil paths 11 are hereinafter collectively referred to as first oil paths 10, 11.

During operation, first oil paths 10, 11 supply hydraulic pressure from hydraulic pressure supply device 7 to each main cylinder unit 30, 50 and enable respective clamp devices 3, 4 to operate. First oil paths 10, 11 are inside base plate 2 parallel to a workpiece W support surface. First oil paths 10, 11 extend along a length of base plate 2 and pass through a center axis of each respective main cylinder unit 30, 50.

A plurality of second oil paths 12, 13 connect hydraulic pressure supply device 7 and hydraulic pressure booster 8 to each main cylinder unit 70, as will be explained. During operation, second oil paths 12, 13 supply hydraulic pressure from hydraulic pressure supply device 7 to each main cylinder unit 70 and enable respective support devices 5, 6 to operate. Second oil paths 12, 13 are inside base plate 2.

Hydraulic pressure booster 8 attaches in a fixed manner to a bottom of base plate 2. A hydraulic pressure discharge port 13*a* connects in a fluid-tight manner to second oil path 13 formed in base plate 2. The position at which hydraulic pressure booster 8 attaches to base plate 2 is not limited to the bottom of base plate 2, but is adaptable according to production needs. For example, hydraulic pressure booster 8 may be attached to the side of base plate 2 or may be outside of base plate 2 altogether.

Figure 3:
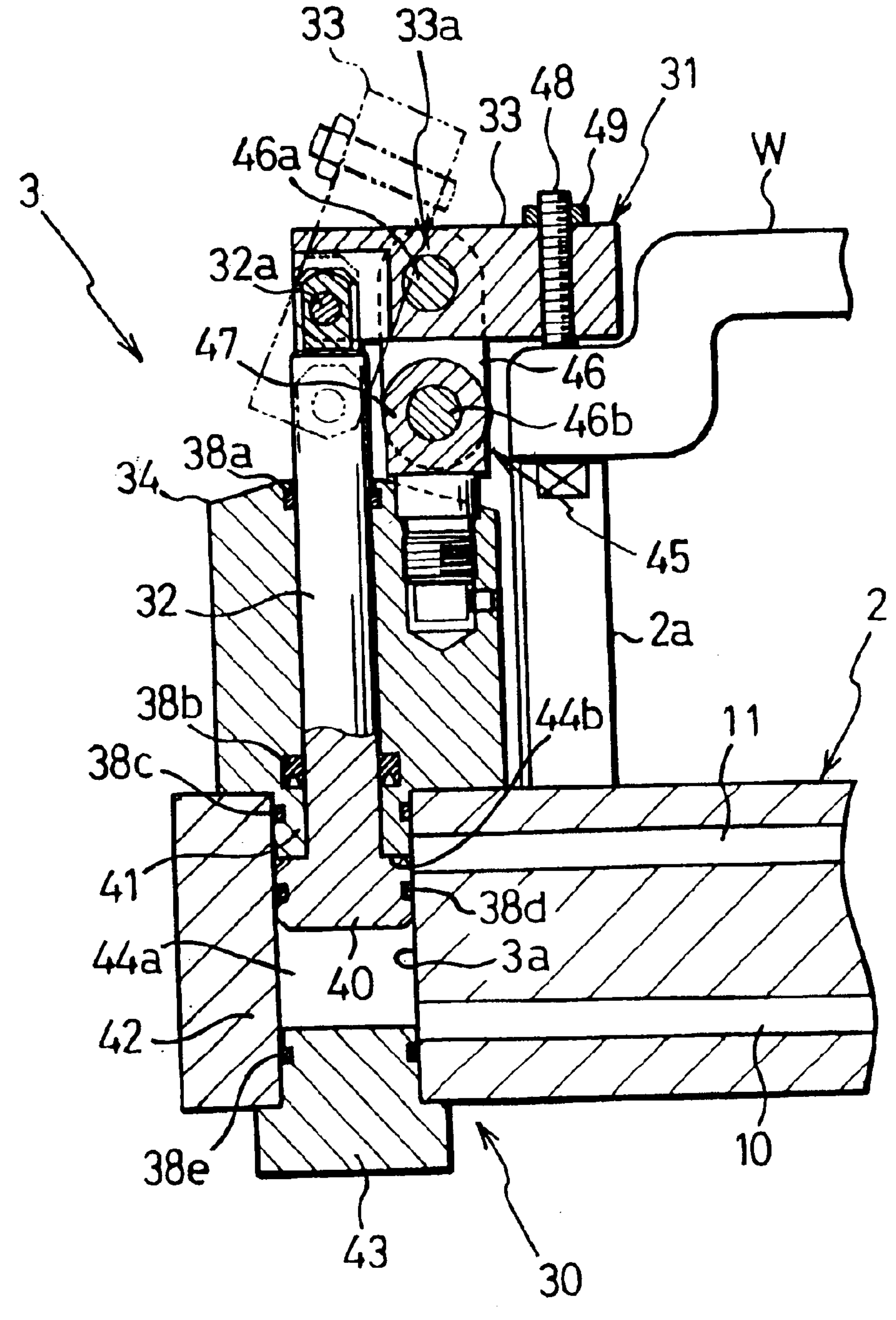
FIG. 3 is a vertical cross-section of a vertically pivoting link clamp device.

Referring now to FIG. 3, each hydraulic clamp device 3 includes main cylinder unit 30 and a piston rod 32. During operation, piston rod 32 operates relative to main cylinder unit 30, as will be explained. An output member 31 rotatably extends from piston rod 32. Output member 31 includes a pivot arm 33. A pin 32*a* pivotably joins pivot arm 32 to main cylinder unit 30.

A bolt (not shown) disengageably secures a guide member 34 to the upper surface of base plate 2. During operation, guide member 34 guides piston rod 32 during clamping and unclamping. A pivot linking mechanism 45 operates and vertically pivots pivot arm 33 in tandem with the operation of piston rod 32.

A rod-side cylinder end wall 41 extends from guide member 34 into main cylinder unit 30 and base plate 2. Rod-side cylinder end wall 41 provides additional support to piston rod 32.

Main cylinder unit 30 includes a cylinder hole 3*a*. Cylinder hole 3*a* is formed integrally within base plate 2. Guide member 34 covers an upper end of cylinder hole 3*a*. Rod-side cylinder end wall 41 extends into and hydraulically seals cylinder hole 3*a*.

A cylinder-side wall 42 surrounds cylinder hole 3*a*. Cylinder-side wall 42 is formed by a portion of base plate 2. A head-side cylinder end wall 43 fills cylinder hole 3*a* opposite rod-side cylinder end wall 41 and seals cylinder hole 3*a*. Head-side cylinder end wall 43 extends from base plate 2 away from guide member 34.

A piston 40 extends from a bottom end of piston rod 32 and fits slidably inside cylinder hole 3*a*. Piston 40 is operable between rod-side cylinder end walls 41 and head-side cylinder end wall 43.

For a clamping operation, a first oil chamber 44*a* is formed by cylinder hole 3*a* between piston 40 and head-side cylinder end wall 43. For unclamping operation, a second oil chamber 44*b* is formed by cylinder hole 3*a* between piston 40 and rod-side cylinder end wall 41. First oil chamber 44*a* connects to clamping oil path 10. Second oil chamber 44*b* connects to unclamping oil path 11.

A sealing member 38*a* seals piston rod 32 to an upper portion of guide member 34. A sealing member 38*b* seals piston rod 32 to a lower portion of guide member 34. A scaling member 38*c* seals rod-side cylinder end wall 41 to cylinder hole 3*a*. A sealing member 38*d* seals piston 40 to cylinder hole 3*a*. A sealing member 38*e* seals head-side cylinder end wall 43 to cylinder hole 3*a*. Collectively, sealing members 38*a* through 38*e* allow each hydraulic clamping unit 3 to hydraulically operate without loss of hydraulic fluid.

A pivot linking member 46 pivotably supports pivot arm 33 at a pivot point 33*a*. A pin 46*a* links pivot linking member 46 to pivot arm 33 at pivot point 33*a*. A pin 46*a* pivotably joins a pivot member 47 to pivot linking member 46. A lower section of pivot member 47 is threadably secured into guide member 34.

During operation, pivot linking mechanism 45 pivotably supports output member 31, simplifies removal of workpiece W, and aids in increasing clamping force. During unclamping operations, when piston rod 32 is at a lowermost position, indicated by the dashed line, pivot arm 33 moves to a recessed position sloping upward at approximately 70 degrees from base plate 2. During clamping operations, when piston rod 32 is at an uppermost position, indicated by the solid line, pivot arm 33 moves to a horizontal clamping position.

An adjustment screw 48 is adjustably threaded through an end of pivot arm 33. Adjustment screw is disengageably secured to pivot arm 33 with a nut 49. During operation, a lower end of adjustment screw 48 presses workpiece W against a pad 2*a*. Pad 2*a* supports a portion of workpiece W and is secured to base plate 2. Pad 2 is selectable according to operator and production needs.

A pressure securing workpiece W to pad 2*a* is adjustable through loosening nut 49 and adjusting adjustment screw 48. The pressure securing workpiece W to pad 2*a* is also adjustable by threadably adjusting the position of pivot member 47.

An important benefit of the present design is that guide member 34 covers a majority of piston rod 32 projected maximumly above the surface of base plate 2. This design prevents piston rod 32 from obstructing pivot arm 33 and the clamping operation of output member 31 while simultaneously protecting piston rod 32 from external debris and dust. Since guide member 34 covers the majority of piston rod 32 it provides strong support and prevents elastic deformation of piston rod 32 during clamping. During assembly of clamp system 1, guide members 34 and piston rods 32 are selectable for length appropriate for pads 2*a* and workpiece W.

An alternative embodiment of the present invention (not shown) forms rod-side cylinder end wall 41 separately from guide member 34 and simplifies assembly. In another alternative embodiment of the present invention (also not shown), rod-side cylinder end wall 41 may include a separate alternative cylinder hole and extend into base plate 2. In this embodiment, cylinder hole 3*a* is replaced with the alternative embodiment.

Figure 4:
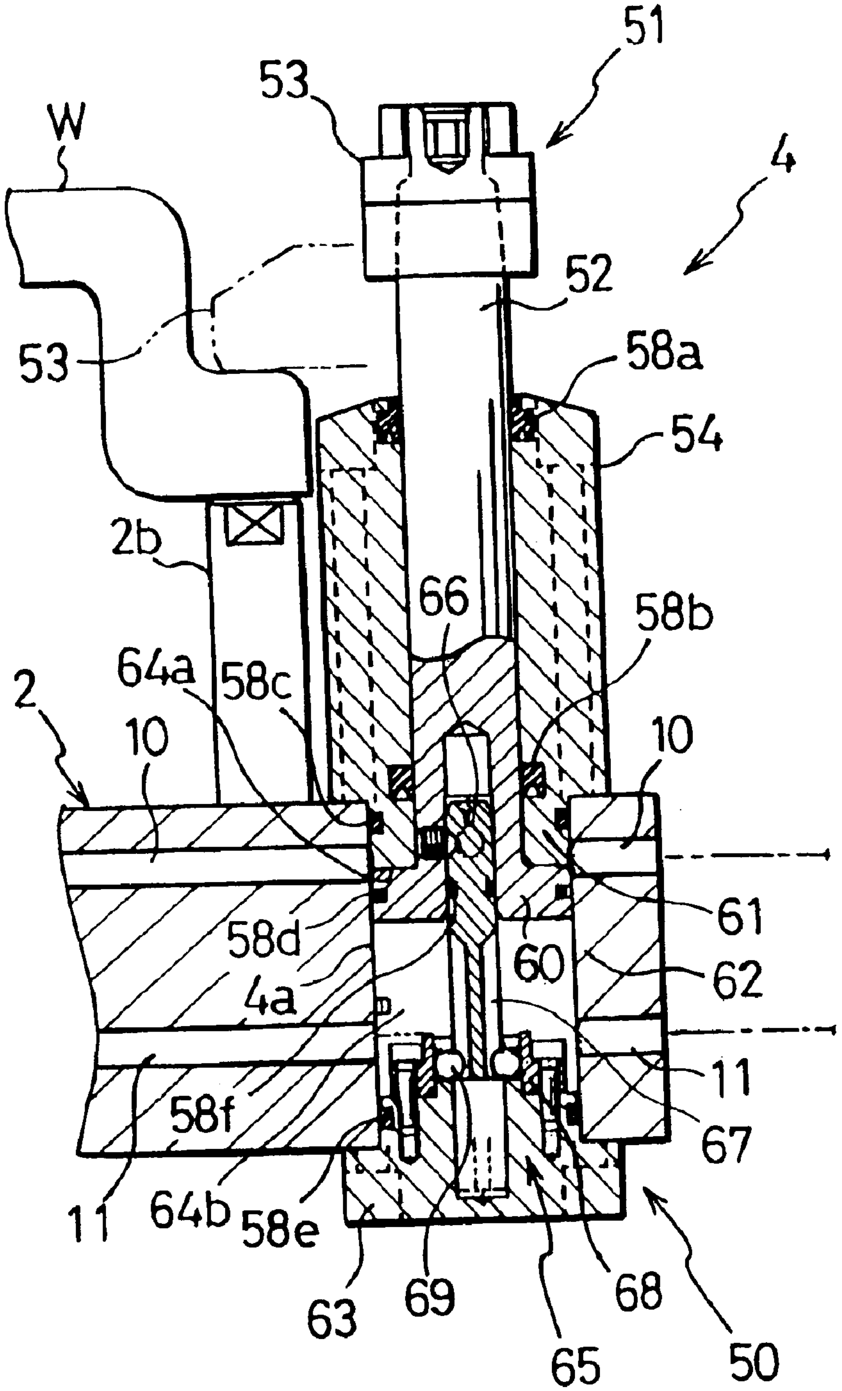
FIG. 4 is a vertical cross-section of a horizontally pivoting clamp device.

Referring now to FIG. 4, main cylinder unit 50 of hydraulic clamp device 4 extends vertically through base plate 2. An output member 51 includes a piston rod 52 extending upward from main cylinder unit 50 away from base plate 2. A pivot arm 53 rigidly extends from an end of piston rod 52. Pivot arm 53 allows easy placement of workpiece W. Bolts (not shown) disengagably secure a guide member 54 to the upper surface of base plate 2. During operation, guide member 54 guides piston rod 52 in a clamp-unclamp cycle.

A rod-side cylinder end wall 61 extends integrally from guide member 54 into an upper end of a cylinder hole 4*a*. Cylinder hole 4*a* extends directly through base plate 2. A head-side cylinder end wall 63 is in a lower end of cylinder hole 4*a* opposite rod-side cylinder end wall 61. A cylinder side wall 62 is a portion of base plate 2 immediately surrounding cylinder hole 4*a*.

A pivoting mechanism 65 extends between head-side cylinder head wall and piston rod 52. Pivoting mechanism 65 enables piston rod 52 to reciprocate axially in tandem with the motion of piston rod 52 and secure workpiece W to base plate 2, as will be explained.

Main cylinder unit 50 operates between rod-side cylinder end wall 61, cylinder side wall 62, and head-side cylinder end wall 63.

A piston 60 extends from a bottom end of piston rod 52 adjacent an interior surface of cylinder hole 4*a*. An oil chamber 64*a* is defined between a top portion of piston 60 and rod-side cylinder end wall 61. An oil chamber 64*b* is defined between a bottom portion of piston 60 and the head-side cylinder end wall 63. Oil chamber 64*a* connects to clamping oil path 10. Oil chamber 64*b* connects to unclamping oil path 11.

A sealing member 58*a* seals between piston rod 52 and a top portion of guide member 54. A sealing member 58*b* seals between piston rod 52 and a bottom portion of guide member 54. A sealing member 58*c* seals between rod-side cylinder end wall 61 and cylinder hole 4*a*. A sealing member 58*d* seals between piston 60 and the inner side walls of cylinder hole 4*a*. A sealing member 58*e* seals between the inner side walls of cylinder hole 4*a* and head-side cylinder end wall 63. A sealing member 58*f* seals between piston 60 and a rod member 66.

Pivot mechanism 65 includes rod member 66. Rod member 66 extends between an inside lower section of piston rod 52 to head-side cylinder end wall 63. A plurality of helical grooves 67 extend along a mid-length section of rod member 60 with a 90 degree twist. Rod member 66 is fixed relative piston rod 52.

A support member 68 securely joins an upper end of head-side cylinder end wall 63. Support member 68 supports and rotatably retains a plurality of balls 69 relative to the upper end of head-side cylinder end wall 63. Balls 69 rotatably engage respective helical grooves 67 and support member 68.

During clamping (lowering) and unclamping (raising) operations, balls 69 engage helical grooves 67 on rod member 66 and ensure piston rod 52 and rod member 66 operate in tandem. During operation of piston rod 52, balls 69 engage helical grooves 67 and simultaneously ensure that pivot arm 53 pivots horizontally through 90 degrees in a reciprocating manner.

During clamping operations, piston rod 52 and pivot arm 53 are at a lower most position indicated by the dashed line in FIG. 4. During unclamping operations, piston rod 52 and pivot arm 53 are at an upper most position indicated by the solid line in FIG. 4. During operation, first oil paths 10, 11 simultaneously connect main cylinder units 30, 50, piston rods 32, 52 operate simultaneously.

Guide member 54 covers a majority of piston rod 52 projected maximumly. Guide 54 maintains alignment and prevents piston rod 52 from obstructing pivot arm 53 during operation. Guide member 54 also guides and provides elastic support to piston rod 52 thereby minimizing elastic deformation during clamping. Guide member 54 further eliminates damage to piston rod 52 due to workplace debris. The strong support by guide member 54 minimizes damage piston rod 52 damage to workpiece W due to misalignment.

A length of piston rod 52 and guide member 54 is selectable based upon predetermined requirements for individual workpieces W. In an alternative embodiment, guide member 54 may consist of individually stackable sections to facilitate rapid adaption to oddly shaped workpieces W. An a further alternative embodiment, cylinder hole 4*a* may be separately formed in a modified main cylinder unit 50 and later securely fitted into base plate 2.

Figure 5:
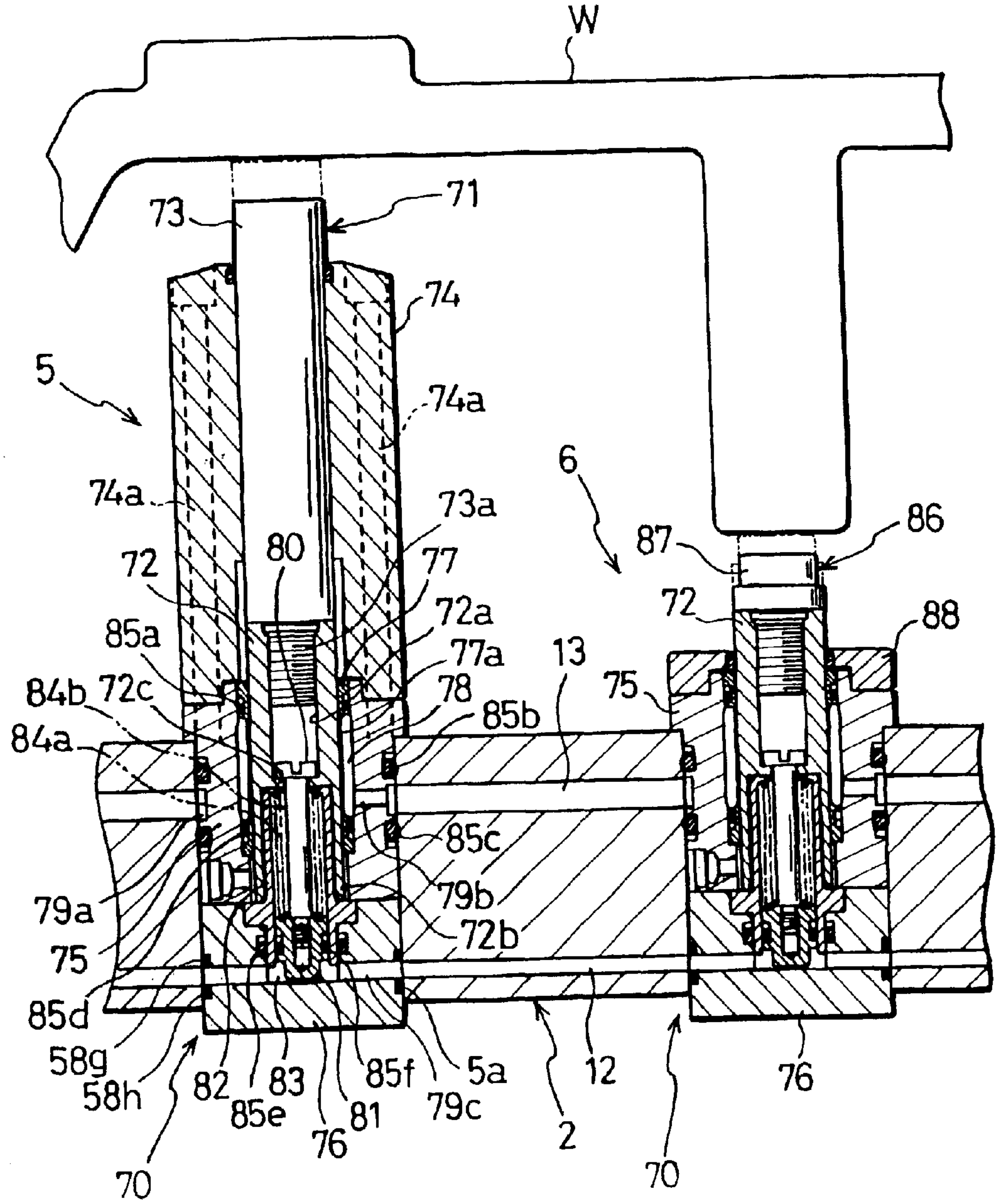
FIG. 5 is a vertical cross-section of a support device.

Referring to FIG. 5, support devices 5, 6 each include a main cylinder unit 70 disposed in a wall of base plate 2. Main cylinder units 70 are oriented along the thickness axis of base plate 2. Main cylinder units 70 also include a support member 71 for supporting workpiece W. A piston rod 72 supports each support member 71. A support rod 73 connects to an upper end of piston rod 72 and supports workpiece W, as will be explained. A guide member 74 guides support member 71 during operation. In sum, support member 71 includes piston rod 72, support rod 73, and guide member 74. Bolts 74*a* disengageably join each guide member 74 to an upper end of main cylinder unit 70.

Main cylinder unit 70 rests within a cylinder hole 51 in base plate 2. A head-side cylinder end wall 76 secures to a bottom side of a cylinder cap 75. Head-side cylinder end wall 76 is opposite guide member 74 on main cylinder unit 70. Bolts 74*a* secure cylinder cap 75 to the upper surface of base plate 2. A majority of head-side cylinder end wall 76 and cylinder cap 75 tightly engage cylinder hole 5*a* and stabilize support devices 5, 6 relative to base plate 2.

An elastic sleeve 77 fits inside main cylinder unit 70. Elastic sleeve 77 slidably fits around an outside of piston rod 72. The outer surfaces of an upper and a lower end of elastic sleeve 77 abut the inner surface of cylinder cap 75.

Guide member 74 positively engages and secures elastic sleeve 77 to cylinder cap 75. The upper and lower ends of elastic sleeve 77 bound a thin cylindrical section 77*a* in the center of elastic sleeve 77.

Elastic sleeve 77, with thin cylinder section 77*a*, and cylinder cap 75 bound an oil chamber 78. Cylinder cap 75 includes a ring-shaped oil path 79*a* and an oil path 79*b*, as will be described. Ring-shaped oil path 79*a* surrounds an outer perimeter section of cylinder cap 75. Ring-shaped oil path 79*a* communicates with second oil path 13. Oil path 79*b* connects ring-shaped oil path 79*a* with oil chamber 78 through cylinder cap 75.

During formation, a threaded hole 72*a* is formed from above at an upper section of piston rod 72. A threaded section 73*a* of support rod 73 is at a lower end of support rod 73. Threaded section 73*a* threadably engages threaded hole 72*a* and joins piston rod 72 to support rod 73.

A cylinder 72*b* is on a lower section of piston rod 72. Cylinder 72*b* opens downward at the lower section of piston rod 72. A partition wall 72*c* partitions cylinder 72*b* into an upper and a lower section. During assembly, a bolt 80 inserts from above and passes through an opening in partition wall 72*c* and extends into the lower section of cylinder 72*b* below threaded hole 72*a*. Partition wall 72*c* retains a head of bolt 80.

After assembly, bolt 80 extends through the center of cylinder 72*b* and below a bottom of cylinder 72*b*. At a lower end of bolt 80, a threaded section threadably engages piston member 81.

During assembly, a cylindrical member 82 slidably fits inside cylinder 72*b* of piston rod 72. Cylinder cap 75 secures cylindrical member 82 to head-side cylinder end wall 76. Piston member 81 slidably fits inside cylindrical member 82.

An oil chamber 83 is a space bounded by head-side cylinder end wall 76, piston member 81, and cylindrical member 82. An oil path 79*c* connects oil chamber 83 to second oil path 12.

A first compression coil spring 84*a* fits onto an outside portion of bolt 80, between an upper ring-shaped wall of cylindrical member 82 and piston member 81. A second compression coil spring 84*b* fits onto the outside of bolt 80, between partition wall 72*c* and piston member 81. First compression coil spring 84*a* biases piston member 81 downward in the figure. Second compression coil spring 84*b* biases support member 71 upward relative to piston member 81 and bolt 80.

During operation, hydraulic pressure is supplied to oil chamber 83 through second oil path 12 in support device 5. The hydraulic pressure drives piston member 81 upward against the bias from first compression coil spring 84*a*. Thereafter, support member 71 moves upward integrally with piston member 81 and bolt 80. Once the end of support member 71 abuts the lower surface of workpiece W, support member 71 stops and piston member 81 and bolt 80 move upward and compresses second compression coil spring 84*b*.

Next, hydraulic pressure, increased by hydraulic pressure booster 8, passes through second oil path 13 into oil chamber 78. The now-boosted hydraulic pressures causes elastic sleeve 77 to elastically deform and contract radially, locking support member 71 and causing workpiece W to receive strong support form base plate 2.

The height of support-member 71, used to support the support points of workpiece W are determined by the size and shape of workpiece W and may be easily adjusted using appropriate lengths for support rod 73 and guide member 74.

Sealing members 85*a* through 85*h* operate to hydraulically seal respective portions of each support device 5, 6 against hydraulic fluid leakage and enable effective supply of hydraulic pressure to support workpiece W.

Support device 6 supports workpiece W in a position lower than support device 5. In place of support member 71 and guide member 74 of support device 5, support device 6 includes a support member 86. Support member 86 includes piston rod 72 and a short support rod connected to the end of piston rod 72. Support member 86 also includes a guide member 88 which guides and supports short support rod 87. Beyond the differences noted above, support device 6 is similar in structure to support device 5 and operates in a similar manner.

Figure 6:
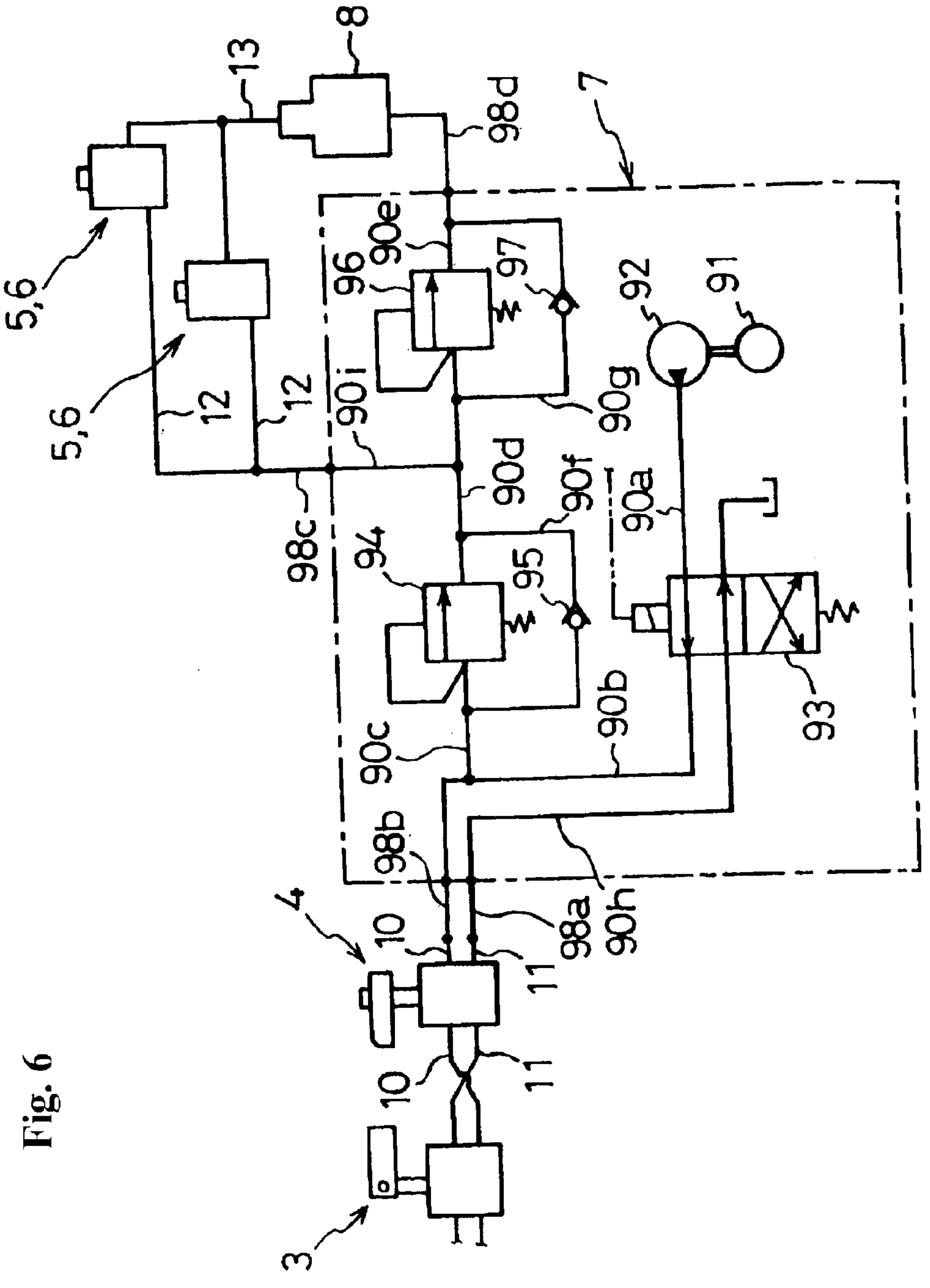
FIG. 6 is a hydraulic circuit diagram of a hydraulic pressure supply device.

Referring now to FIG. 6, hydraulic pressure supply device 7 includes a hydraulic pressure pump 92 driven by a motor 91. Hydraulic pressure supply device 7 generates hydraulic pressures in the range of 7 Mpa. Hydraulic pressure supply device 7 also includes an electromagnetic direction switching valve 93 connecting to hydraulic pressure pump 92 along an oil path 90*a*.

A first sequence valve 94 is activated at a first pressure setting (e.g., 7 Mpa). First sequence valve 94 connects to an oil path 90*c*. Oil path 90*c* extends from an oil path 90*b* away from direction switching valve 93. Hydraulic pressure supply device 7 also includes a check valve 95 disposed in a bypass oil path 90*f* of a first sequence valve 94. A second sequence valve 96 activates at a second pressure setting (e.g., 7 MPa) and connects to first sequence valve 94 along an oil path 90*d* and a check valve 97. Check valve 97 is in a bypass oil path 90*g* of second sequence valve 96.

A hydraulic pressure pipe 98*a* connects oil path 90*h* extending from direction switching valve 93 to first oil path 11 of base plate 2. Hydraulic pressure pipe 98*b* connects oil path 90*b* extending from direction switching valve 93 to first oil path 10 of base plate 2. A hydraulic pressure pipe 98*c* connects an oil path 90*i* and hydraulic path 90*d* to second oil path 12 of base plate 2. A hydraulic pressure pipe 98*d* connects oil path 90*e* and hydraulic pressure booster 8.

Hydraulic pressure supply device 7 also includes a control unit (not shown). The control unit controls motor 91, electromagnetic direction switching valve 93, and other components in hydraulic pressure supply device 7.

During operation, direction switching valve 93 provides hydraulic pressure, supplied from hydraulic pressure supply device 7, to the plurality of clamp devices 3, 4 along first unclamping hydraulic path 11. Upon receiving hydraulic pressure, pivot arms 33 pivot to a recessed position at an angle of approximately 70 degrees relative to the clamping position of vertically pivoting clamp devices 3. Additionally, upon receiving hydraulic pressure, pivot arms 53 move to the recessed position by raising and pivoting from the clamping position of horizontally pivoting clamp devices 4. Thus, clamp devices 3, 4 are transferred to into an unclamped state. In this state, operators mount workpiece W and align workpiece W to base plate 2.

After mounting and aligning, direction switching valve 93 is activated, and hydraulic pressure flows from hydraulic pressure supply device 7 to the plurality of clamp devices 3, 4 along first clamping oil path 10 in base plate 2. More specifically, upon receiving hydraulic pressure along first oil path 10, in the vertically pivoting clamp devices 3, pivot arms 33 orient horizontally into a clamping position for clamp device 3, and press workpiece W against base plate 2. Additionally, in horizontally pivoting clamp devices 4, pivot arms 53 pivot and approach workpiece W in a clamping position. Thus, clamp devices 3, 4 enter the clamped state and securely press workpiece W against base plate 2.

During initial clamping operation, the hydraulic pressure applied to first sequence valve 94 from hydraulic pressure supply device 7 does not reach the first pressure setting (e.g., 7 MPa). For this reason, first sequence valve 94 is in a closed state, and hydraulic pressure does not reach oil path 90*d*. Once clamp devices 3, 4 clamp workpiece W to base plate 2, the first pressure setting for first sequence valve 94 is reached, and first sequence valve 94 is opens and supplies hydraulic pressure to oil path 90*d*.

When hydraulic pressure reaches oil path 90*d* through first sequence valve 94, hydraulic pressure passes through second oil path 12 to support devices 5, 6. Once support devices 5, 6 receive hydraulic pressure, respective support members 71, 86 rise and abut the lower surface of workpiece W. Up to this point the hydraulic pressure acting on second sequence valve 96 in hydraulic pressure supply device 7 does not reach the second pressure setting (e.g., 7 MPa), and second sequence valve 96 remains in a closed state and does not supply hydraulic pressure supplied to oil path 90*e*.

Once support members 71, 86 abut workpiece W, second sequence valve 96 reaches its second pressure setting (e.g., 7 Mpa). Upon reaching the second pressure setting, second sequence valve 96 opens and supplies hydraulic pressure to oil path 90*e*. Oil path 90*e* supplies hydraulic pressure to hydraulic pressure booster 8 which operates to increase the hydraulic pressure supplied to the plurality of support devices 5, 6 along second oil path 13. Upon receiving the now increased hydraulic pressure, support members 71, 86 of support devices 5, 6 lock firmly and strongly support workpiece W. Once workpiece W is supported by support devices 5, 6 and clamped by clamp devices 3, 4 various machining operations are performed securely, quickly, and with sufficient support to protect, the machining tool, workpiece W, and clamp system 1.

In support system 1, guide members 34, 54, each integral with respective rod-side cylinder end walls 41, 61, reliably guide respective piston rods 32, 52. Guide members 34, 54 are disengageably secured to base plate 2, and may be quickly and easily disengaged and replaced along with new piston rods 32, 52. This simple disengagement and replacement allows easy adjustment based on a size and shape of workpiece W and changeable clamping requirements and positions.

As a further advantage, the hydraulic ports of main cylinder units 30, 50 are easily positioned inside base plate 2 in a simple machining process parallel along the length of base plate 2. Since main cylinder units 30, 50 of clamp devices 3, 4 mount into base plate 2 along the thickness axis of the base plate 2, they easily match with the hydraulic ports and first oil paths 10, 11

Since clamp devices 3, 4 are disposed along the edges of base plate 2, first oil paths 10, 11 can be disposed along a line passing through respective main cylinder units 30, 50 and connect main cylinder units 30, 50 in series. Clamping oil path 10, and unclamping oil path 11 are perpendicular to the surface of base plate 2 and allow a very simple structure. This simple structure makes alternative design and processing easier. Where an alternative workpiece W does not require each clamp device 3, 4, a respective clamp device 3, 4, may be replaced with a simple hydraulic passage unit (not shown) which seals the respective cylinder hole 3*a*, 4*a* and easily passes hydraulic pressure to the remaining clamp devices 3, 4.

There is no need to form first oil paths 10, 11 at the edges of clamp devices 3, 4 on base plate 2, thus reducing the need for associated space and minimizing size and cost. Since guide members 34, 54 are not integral with hydraulic fluid passage, guide members 34, 54 may be made compact along an axis parallel to the surface of base plate 2 and base plate 2 may be further reduces in size for predetermined workpiece sizes and shapes. This reduction in size, increases a proportion of the work area to the upper surface of base plate 2.

Since the need to provide hydraulic pipes for main cylinder units 30, 50 is eliminated, clamp devices 3, 4 of the clamp system 1 have a simple structure and reduced production costs. Further, since external hydraulic pipes connecting clamp devices 3, 4 are be omitted, system failures caused by damage to hydraulic pipes and obstructions to transporting base plate 2 are eliminated.

As an additional advantage support members 71, 86 of support devices 5, 6 are easily and simply locked so that they cannot be moved, thus allowing an easily maintained full-support and full-clamp state.

Support members 71, 86 are easily arranged by moving compression spring 84*b* relative to piston member 81, which is raised directly by hydraulic pressure. As a result, the ends of support members 71, 86 are reliably and quickly abutted against the support points of workpiece W. Thus, workpiece W, is easily and reliably supported against base plate 2 by the plurality of support devices 5, 6. This support, reliably prevents flexure and vibration in workpiece W during machining and improves processing precision.

Main cylinder units 70 of support devices 5, 6 mount directly in the wall of base plate 2 and allow the wall of base plate 2 to effectively serve as a section of main cylinder units 70. Since second oil paths 12, 13 are in the wall of base plate 2, clamp system 1 has an easily formed simple structure thus reducing production costs. Since external hydraulic pipes connecting support devices 5, 6 are eliminated, system failures caused by damage to hydraulic pipes or obstructions to transportation are eliminated.

As a further advantage, hydraulic booster 8 easily provides high hydraulic pressure to the plurality of support devices 5, 6. Hydraulic booster 8 easily increases the hydraulic pressure received from hydraulic pressure supply device 7. As a result, clamp system 1 requires only one hydraulic pressure supply device 7, is reduced in cost, simplified, and increases production efficiency.

During operation, since each output member 31, 51 rotates away from workpiece W, mounting or moving operations for workpiece W are simplified and faster and more efficient production is possible. Individually, output member 31 includes pivot arm 33 pivotably supported at pivot point 33*a* and easily rotates away from the clamped position. As a further advantage, support link member 46 supports pivot point 33*a* and using a lever-advantage increases and transfers hydraulic force from piston rod 32 to workpiece W while minimizing deflection of pivot arm 33.

Below, in addition to the alternative embodiments described above, specific additional alternatives of clamp system 1 are described. Elements similar to those of the above embodiments are assigned identical numerals. Other structures, operations, and advantages are essentially identical to those of the embodiment described above, and the corresponding descriptions are omitted.

1) Alternative Embodiment 1

Figure 7:
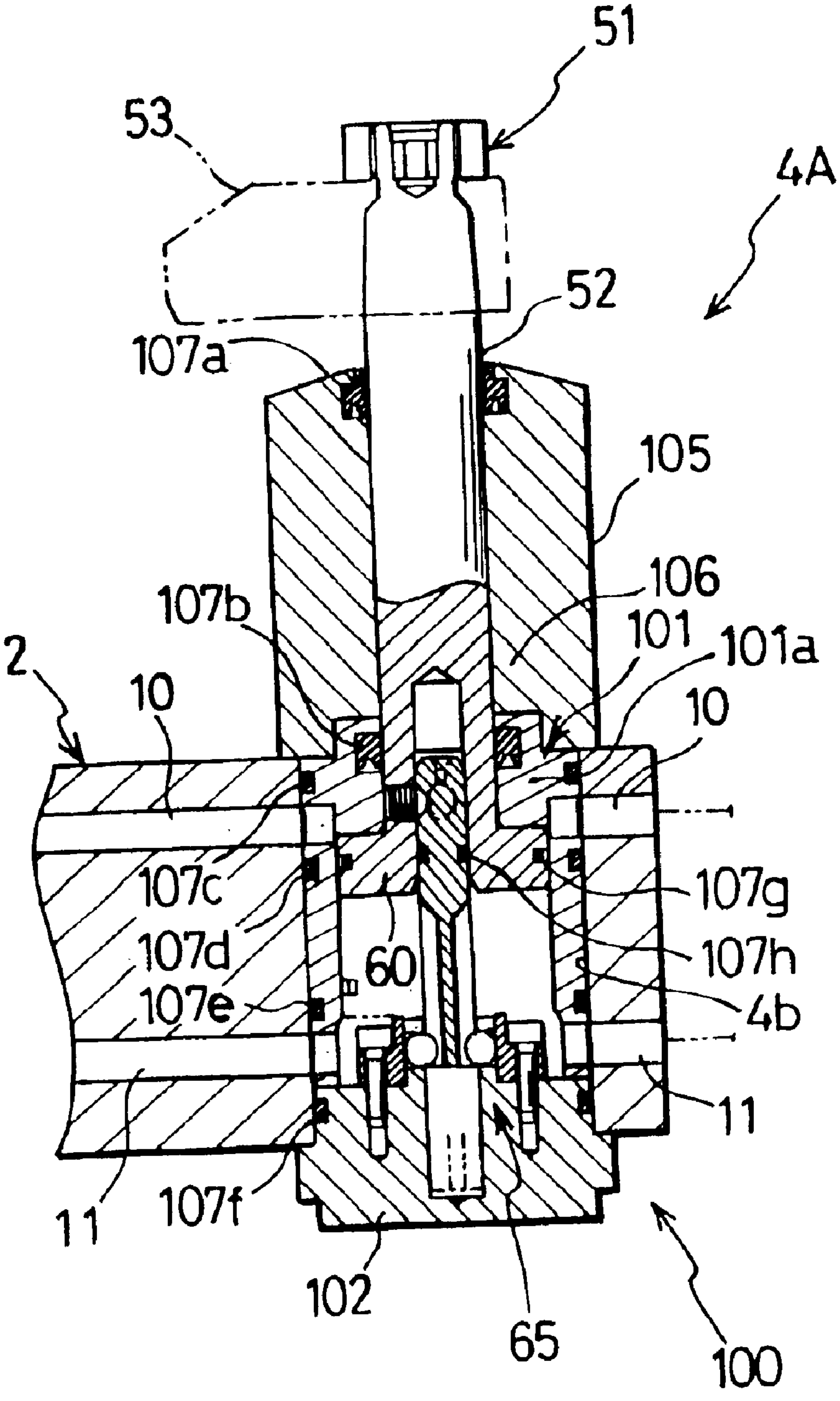
FIG. 7 is a vertical cross-section of a clamp device in a first alternative embodiment.

Referring now to FIG. 7, a horizontally pivoting clamp device 4A includes a main cylinder unit 100 mounted in the wall of base plate 2. An output member 51 includes a piston rod 52 extending away from the surface of base plate 2 and a pivot arm 53. Pivot arm 53 is fixed to the end of piston rod 52. A guide member 105 is disengageably secured to the surface of base plate 2. Guide member 105 guides and supports piston rod 52 during operation. As with guide members 34, 54, guide member 105 is covers a majority of piston rod 52 and provides similar protection from deflection and debris.

Main cylinder unit 100 includes a cylinder cap 101 and a head-side cylinder end wall 102. H-lead-side cylinder end wall 102 secures to the lower end of cylinder cap 101. During assembly, a majority of cylinder cap 101 and head-side cylinder end wall 102 are inserted into and secured in a cylinder hole 4*b* in base plate 2. An upper wall 101*a* of cylinder cap 101 forms a rod-side cylinder end wall (not numbered).

A bolt (not shown) secures guide member 105 the upper surface of base plate 2. Guide member 105 disengageably secures cylinder cap 101 to base plate 2.

A lower end 106 of guide member 105 also forms at least a portion of the rod-side cylinder end wall and further supports guide member 105. Sealing members 107*a* through 107*h* hydraulically seal respective members of horizontally pivoting clamp device 4A against hydraulic leakage and enable swift and secure movement. Cylinder cap 101 and guide member 105 may be formed integrally in a further simplification of the present design thus further simplifying assembly, reducing costs, and improving production efficiency.

Figure 8:
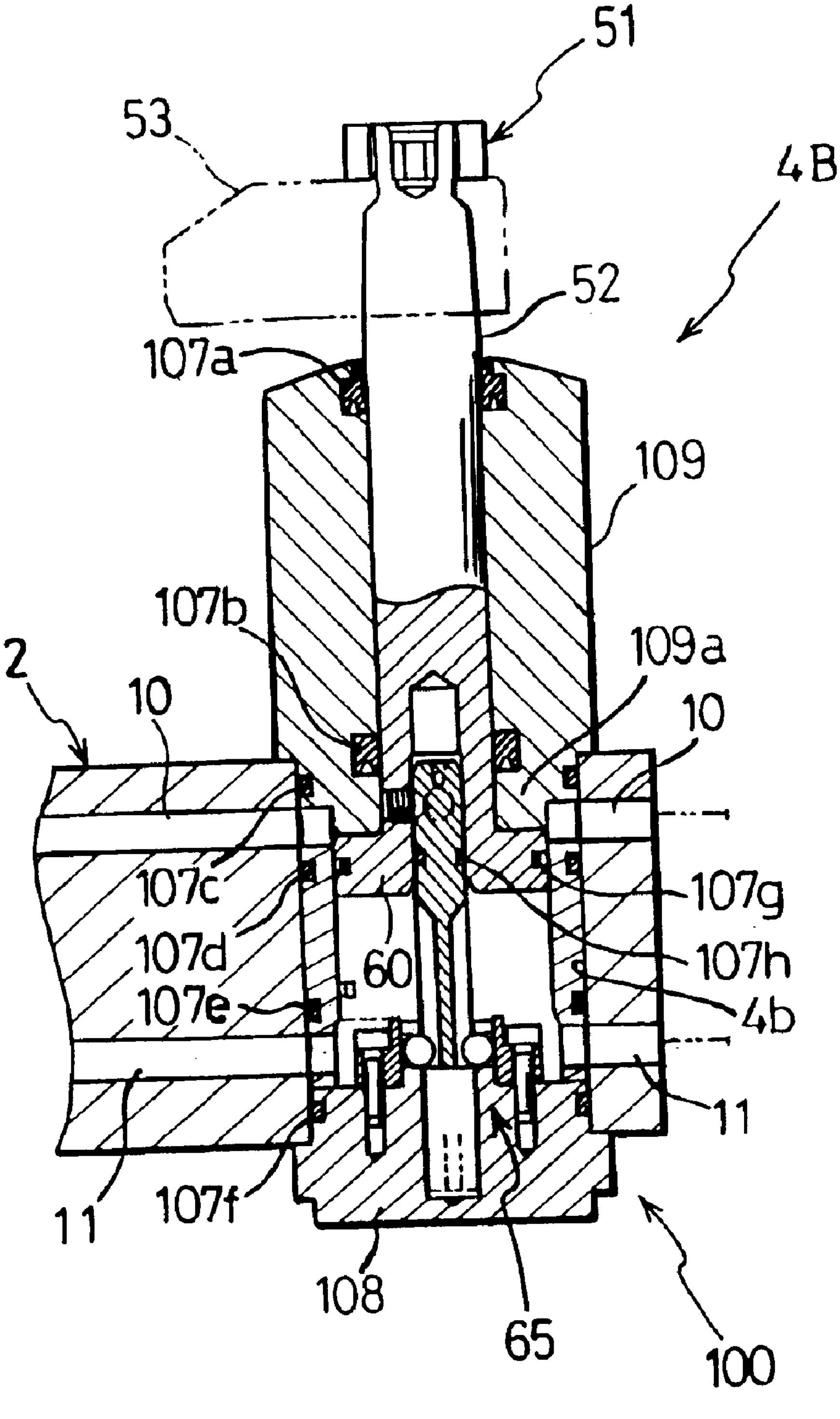
FIG. 8 is a vertical cross-section of a base plate of a clamp device in a second alternative embodiment.

2) Alternative Embodiment 2 (FIG. 8)

Referring now to FIG. 8, a clamp device 4B includes a cylinder cap 108 and a guide member 109. Cylinder cap has a lower portion forming a head-side cylinder end wall (not numbered). Guide member 109 covers cylinder cap 108 and the top of cylinder hole 4*b*, forming the rod-side cylinder end wall 109*a*, and securely guiding piston rod 52 during operation.

As with guide members 34, 54 described above, guide member 109 is high enough to cover the majority of the projected portion of piston rod 52 during operation.

Figure 9:
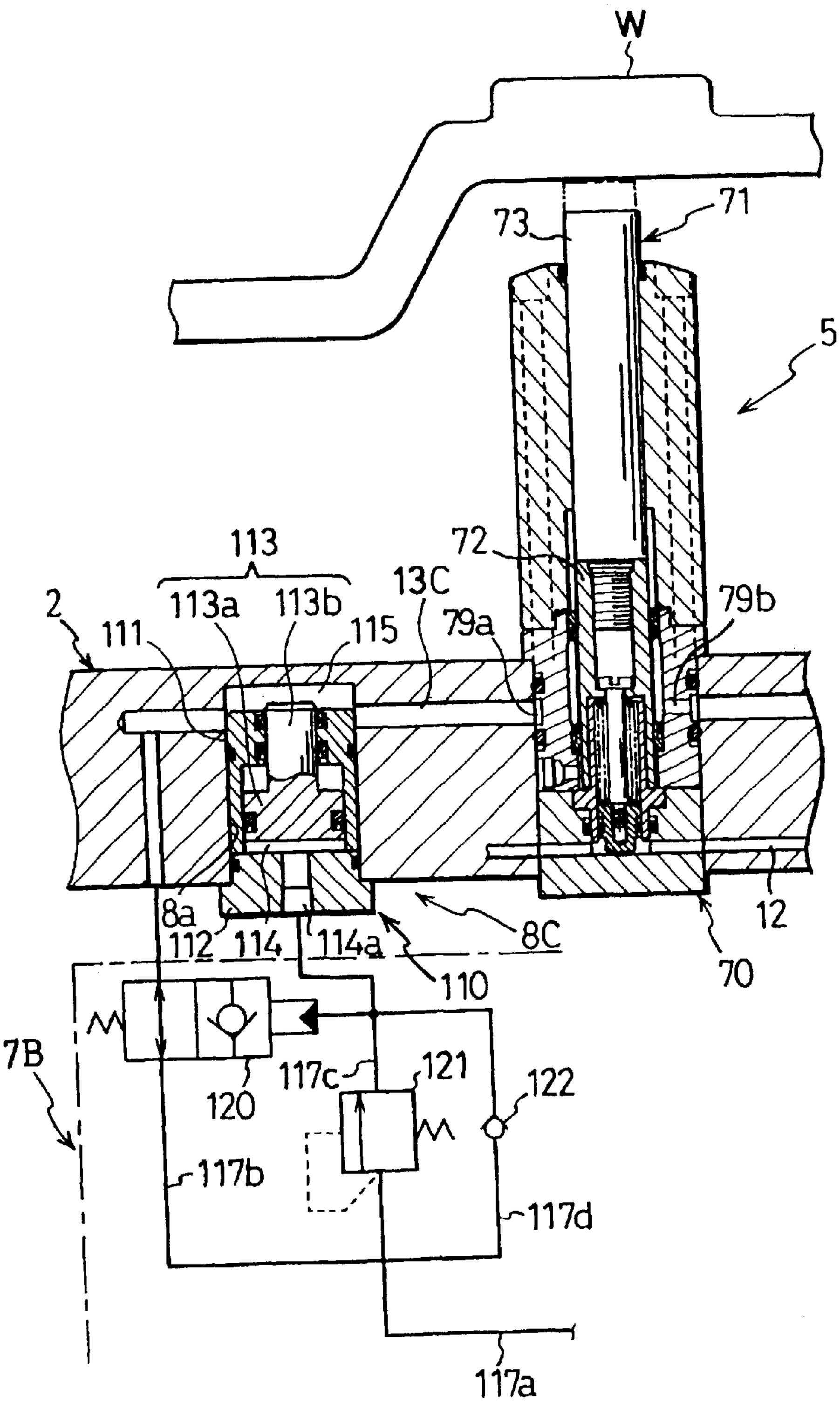
FIG. 9 is a vertical cross-section of a support device in a third alternative embodiment.

3) Alternative Embodiment 3:

Referring now to FIG. 9, a hydraulic pressure booster 8C replaces hydraulic pressure booster 8. A main cylinder unit 110 securely mounts to base plate 2. Main cylinder unit 110 includes a cylinder cap 111 and a head-side cylinder end wall 112. Cylinder cap 111 forms a majority of main cylinder unit 110. Head-side cylinder end wall 112 firmly secures to the bottom end of cylinder cap 111.

During assembly, cylinder cap 111 and an upper section of head-side cylinder end wall 112 are inserted into a hole 8*a* and secured by a bolt (not shown) Hole 8*a* is formed in a bottom of base plate 2.

A piston member 113 slidably fits within cylinder cap 111. During operation, a large-diameter piston 113*a* of piston member 113 slidably operates between head-side cylinder end wall 112 and cylinder cap 111. An oil chamber 114 is formed between cylinder cap 111, head-side cylinder end wall 112, and large-diameter piston member 113*a*.

A section of hole 8*a* above cylinder cap 111 forms a booster chamber 115. A small-diameter piston 113*b* on piston member 113 projects into booster chamber 115. Booster chamber 115 connects to an oil path 13C.

A hydraulic pressure supply device 7B includes an oil path 117*a* receiving hydraulic pressure from the hydraulic pump (not shown in the figure). A pilot hydraulic switching valve 120 is disposed on oil path 117*a*. An oil path 117*b* connects oil path 13C of base plate 2 to hydraulic pressure supply device 7B.

A sequence valve 121 is on an oil path 117*c*. Oil path 117*c* connects a hydraulic supply port 114*a*, on main cylinder unit 110, to sequence valve 121. Sequence valve 121 communicates with oil path 117*a* and oil chamber 114 of hydraulic booster 8C. A check valve 122 is disposed in a bypass oil path 117*d* of sequence valve 121.

During operation of this embodiment, clamp devices 3, 4 clamp workpiece W to base plate 2. Hydraulic pressure from the hydraulic pump and hydraulic pressure supply device 7B is supplied to support device 5 though oil path 117*b* and second oil path 13C in base plate 2.

Additionally, while applying an appropriate load to support member 71, hydraulic pressure is supplied to second oil path 12 of the base plate 2 and the support member 71 raises. When support member 71 abuts workpiece W, the hydraulic pressure increases and sequence valve 121, which had been closed opens when the raised hydraulic pressure releases a first pressure setting, thus causing hydraulic pressure to enter hydraulic pressure booster 8C.

As hydraulic pressure booster 8C receives hydraulic pressure, piston member 113 activates and the hydraulic pressure is increased in booster chamber 115. Oil path 13*c* transports the now-boosted hydraulic pressure to support device 5, and support member 71 firmly locks and supports workpiece W.

4) Alternative Embodiment 4

Figure 10:
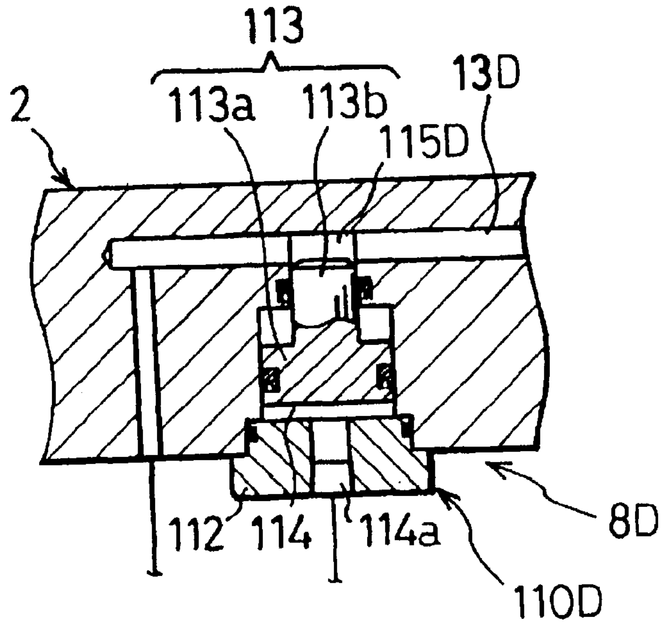
FIG. 10 is a vertical cross-section of a booster in a fourth alternative embodiment.

Referring now to FIG. 10, in a hydraulic pressure booster 8D, cylinder cap 111 of hydraulic pressure booster 8 is eliminated. A hole (not labeled) is in base plate 2 and securely mounts main cylinder unit 110D in the wall of base plate 2. In this embodiment, small-diameter piston 113*b* projects into booster chamber 115D above the head-side cylinder wall, and booster chamber 115D connects to oil path 13D.

5) Alternative Embodiment 5

Figure 11:
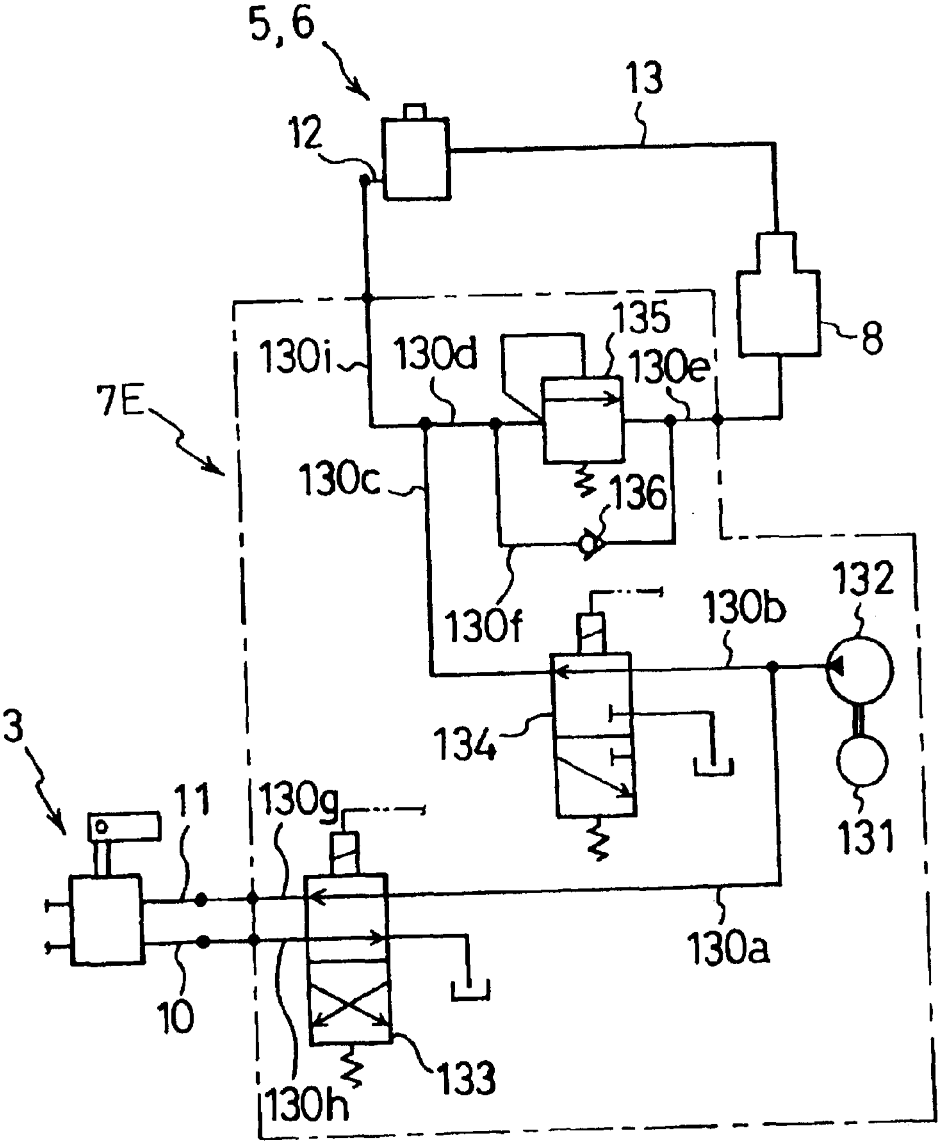
FIG. 11 is a hydraulic circuit diagram of a hydraulic pressure supply device according to a fifth alternative embodiment.
Figure 12:
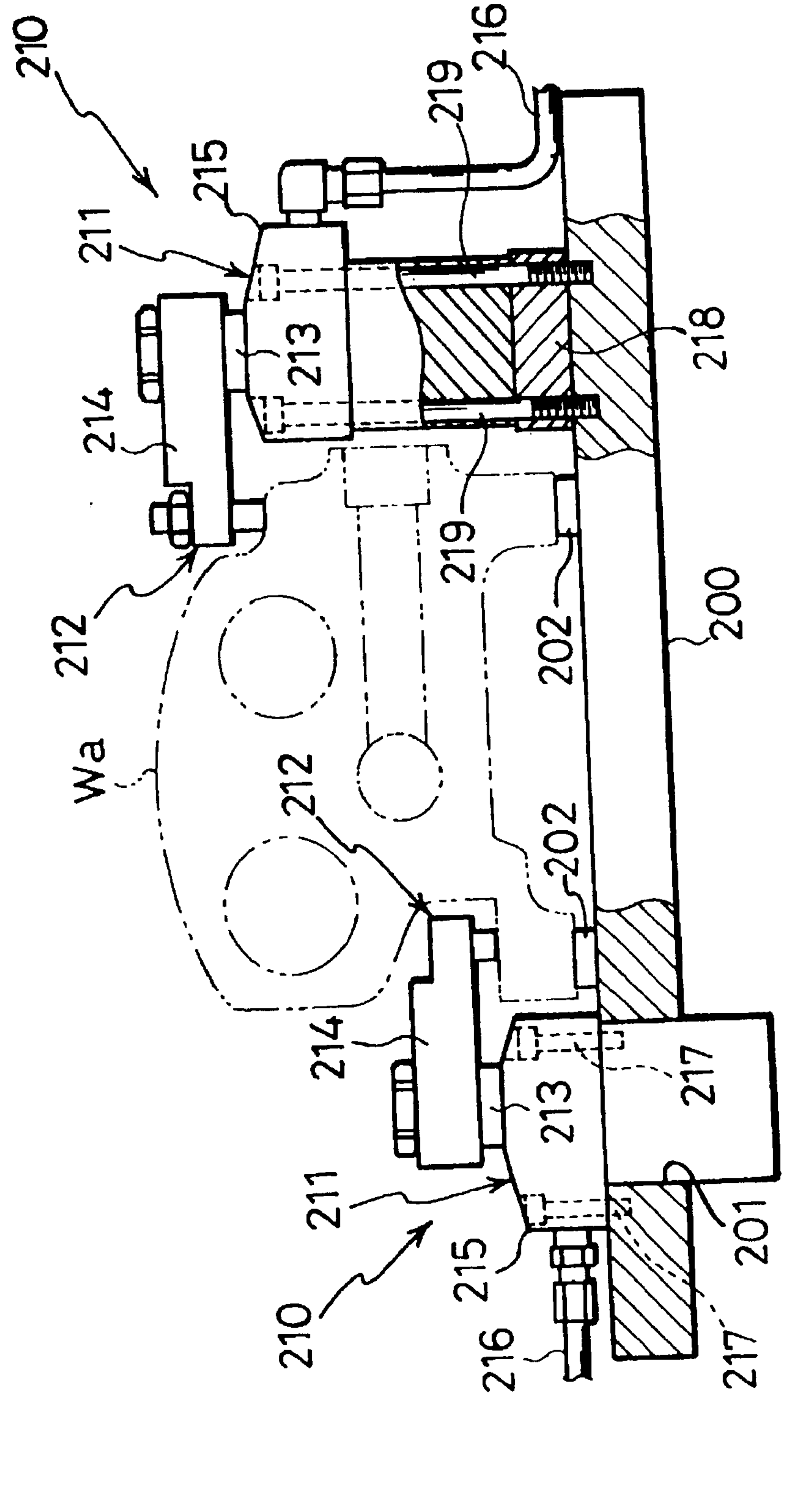
Fig. 12 Prior Art
FIG. 12 is a front-view of a clamp system according to conventional technology.
Figure 13:
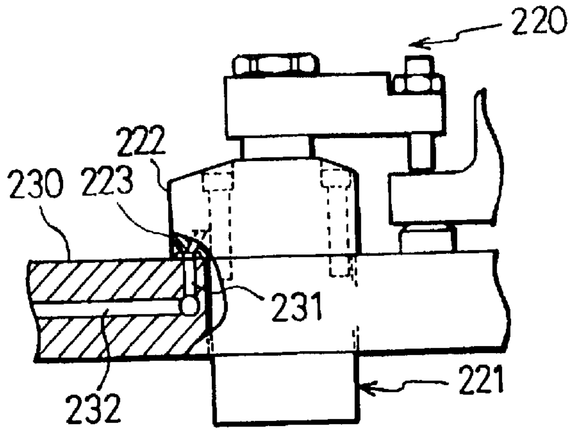
Fig. 13 Prior Art
FIG. 13 is a partial front-view of a clamp system according to conventional technology.
Figure 14:
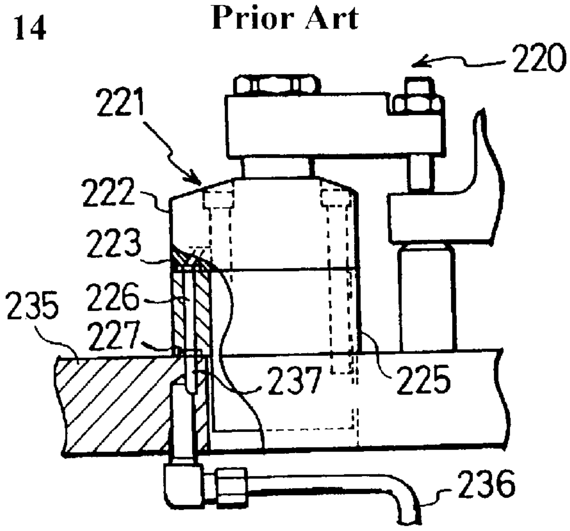
Fig. 14 Prior Art
FIG. 14 is a partial front-view of a clamp system according to conventional technology.
Figure 15:
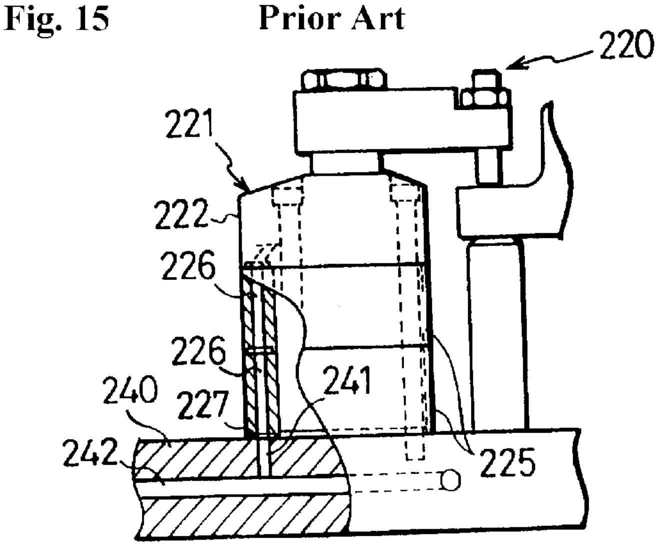
Fig. 15 Prior Art
FIG. 15 is a partial front-view of a clamp system according to conventional technology.
Figure 16:
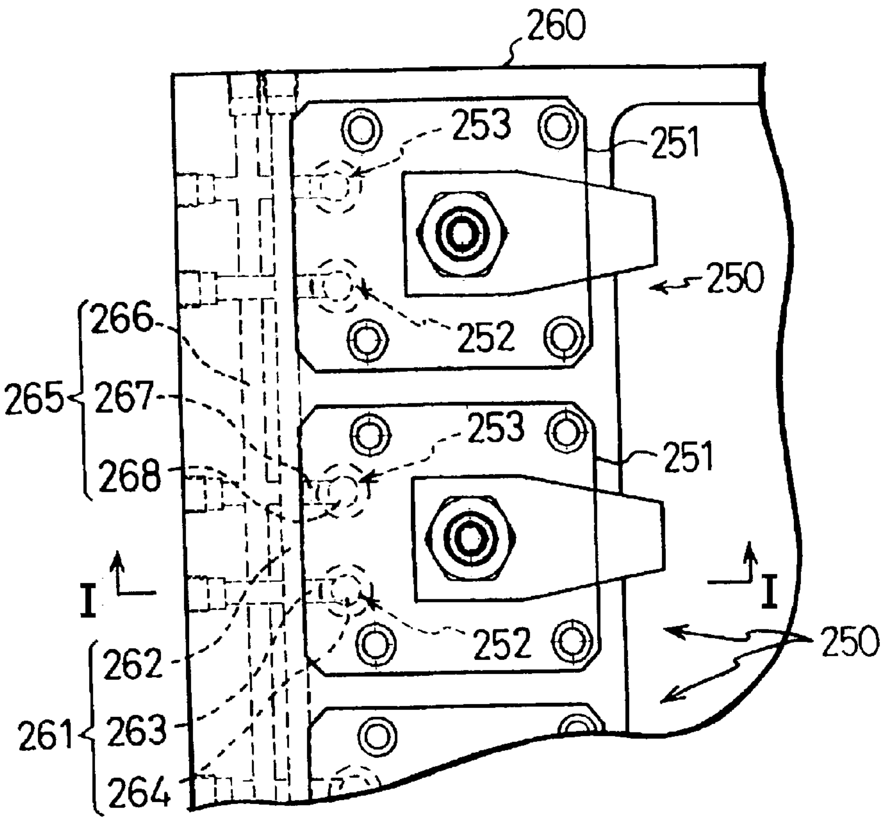
Fig. 16 Prior Art
FIG. 16 is a schematic plan of a clamp system according to conventional technology.
Figure 17:
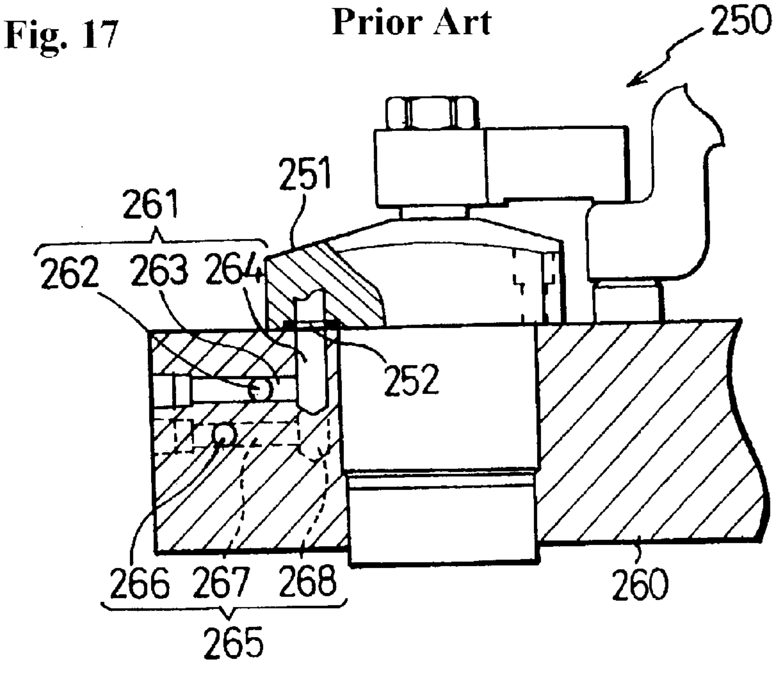
Fig. 17 Prior Art
FIG. 17 is a partial vertical cross-section of FIG. 16 along section I—l.

Referring now to FIG. 11, a hydraulic pressure supply device 7E includes a hydraulic pump 132 driven by a motor 131. Hydraulic pump 132 and motor 131 operate to provide a hydraulic pressure (e.g., 7 Mpa) to clamping system 1. An oil path 130*a* connects an electromagnetic switching valve 133 connects to hydraulic pump 132. An oil path 130*b* connects an electromagnetic direction switching valve 134 to hydraulic pump 132. An oil path 130*c* and an oil path

130*d* connect a sequence valve 135 to direction switching valve 134. Sequence valve 135 activates at a first pressure setting (e.g., 7 Mpa). A check valve 136 is disposed in a bypass oil path 130*f* of sequence valve 135.

A pair of oil paths 130*g*, 130*h* extend from direction switching valve 133 and connect to respective first oil paths 10, 11 in base plate 2. An oil path 130*i* extends from oil paths 130*c*, 130*d* and connects to second oil path 12 of base plate 2. Oil path 130*e* extends from sequence valve 135 to hydraulic booster 8.

During operation, when direction switching valve 134 is switched to release hydraulic pressure, direction switching valve 133 is controlled, and first oil path 10 passes hydraulic pressure from hydraulic pressure supply device 7E to clamp devices 3.

Clamp devices 3 receive the hydraulic pressure and enter the clamped state and secure workpiece W to base plate 2. Once workpiece W is clamped, direction switching valve 134 is controlled supplies hydraulic pressure to oil path 130*c*.

Oil path 130*c* passes hydraulic pressure through second oil path 12 and base plate 2 to support devices 5, 6. The hydraulic pressure causes support members 71, 86 to rise and abut the lower surface of workpiece W. Once support members 71, 86 reach workpiece W, the first pressure setting is applied to sequence valve 135. Upon reaching the first pressure setting, sequence valve 135 opens and supplies hydraulic pressure to hydraulic pressure booster 8. Hydraulic pressure booster 8 increases the hydraulic pressure, and returns the now-boosted hydraulic pressure through second oil path 13 to support devices 5, 6.

6) Alternative Embodiment 6

In another alternative embodiment, clamping devices 3, 4 may be alternatively replaced with all clamping devices 3 or all clamping devices 4 depending upon operation and production requirements.

7) Alternative Embodiment 7

In an alternative embodiment main cylinder units 30 of vertical pivoting clamp devices 3 may be mounted in the wall of the base plate by providing a cylinder cap and head-side cylinder end wall as in horizontally pivoting clamp 4A of FIG. 8, and inserting the cylinder cap and the head-side cylinder end wall into a cylinder hole formed in base plate 2.

8) Alternative Embodiment 8

In an alternative embodiment, alternative clamping devices other than clamp devices 3, 4, 4A, 4B may be used as the hydraulic clamp devices, and the main cylinder units of these alternative clamping devices may be mounted on the thickness axis of base plate 2.

9) Alternative Embodiment 9

In an alternative embodiment base plate 2 may be arranged at any angle according to operational and mechanical needs. Base plate 2 is not restricted to horizontal positioning. Further, two separate base plates 2 may be used in tandem at different angles to support complex workpieces W.

The present invention may also be implemented with alternative types of clamp systems other than those described above.

In understanding hydraulic pressure delivery to clamp devices 3, 4 through first oil paths 10, 11, it should be understood, that the delivery of hydraulic pressure downstream from hydraulic pressure supply device 7, where identified as ‘in series,’ is substantially in series through each respective clamp device 3, 4 (see FIGS. 2 and 6) despite clamp devices 3, 4 being separated in different rows, each row is supplied simultaneously in series. In other words, in each row, if a single clamp device 3, 4 fails to pass hydraulic pressure, there is no passage beyond the failed device.

It understanding hydraulic pressure delivery to support devices 5, 6 through second oil paths 12, 13, it should be understood, that the delivery of regular and boosted hydraulic pressure downstream from hydraulic pressure supply device 7 and hydraulic pressure booster 8, where identified as ‘in parallel,’ is substantially in parallel from a common supply line between each respective support device 5, 6 (see FIGS. 2 and 6) despite the individual physical arrangement of support devices 5, 6.

Although only a single or few exemplary embodiments of this invention have been described in detail above, those skilled in the art will readily appreciate that many modifications are possible in the exemplary embodiment(s) without materially departing from the novel teachings and advantages of this invention. Accordingly, all such modifications are intended to be included within the spirit and scope of this invention as defined in the following claims. In the claims, means-plus-function clauses are intended to cover the structures described or suggested herein as performing the recited function and not only structural equivalents but also equivalent structures. Thus, for example, although a nail, a screw, and a bolt may not be structural equivalents in that a nail relies entirely on friction between a wooden part and a cylindrical surface, a screw's helical surface positively engages the wooden part, and a bolt's head and nut compress wooden part together, in the environment of fastening wooden parts, a nail, a screw, and a bolt may be readily understood by those skilled in the art as equivalent structures.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A clamp system, for securing a workpiece, comprising:

a base plate;

a plurality of hydraulic clamping devices on said base plate;

a first oil path formed in a wall of said base plate to supply a hydraulic pressure from a hydraulic pressure supplying means to each of said plurality hydraulic clamping devices;

each of said hydraulic clamping devices including, a main cylinder unit disposed in said wall of said base plate and oriented along a thickness axis of said base plate, an output member including a piston rod extending from said main cylinder unit toward an outside of a surface of said base plate, a guide member disengageably secured to said surface of said base plate and guiding said piston rod to allow a forward and a backward motion, said guide member covering a major portion of said piston rod projecting out from said surface and not obstructing a clamp operation of said output member, a rod-side cylinder end wall of said main cylinder unit disengageably secured to said baseplate, wherein, said workpiece, clamped by said plurality of clamping devices, is supported from said base plate by a plurality of support devices;

each of said support devices including a second main cylinder unit disposed in said wall of said base plate and oriented along a thickness axis of said base plate;

a support member including a second piston rod extending from said second main cylinder unit toward said outside of said surface of said base plate;

said base plate including a second oil path formed in said wall thereof to supply said hydraulic pressure from said hydraulic pressure supplying means to said second main cylinder units of said plurality of support devices and a hydraulic pressure booster means disposed on said base plate effective to increase said hydraulic pressure received from said hydraulic pressure supplying means and supplying said increased hydraulic pressure to said plurality of support devices via said second oil path.

2. A clamp system, for disengageably securing a workpiece to a base plate, comprising:

a plurality of clamping devices on said base plate;

said plurality of clamping devices effective to hydraulically and securely clamp said workpiece to said base plate during an external operation;

a plurality of support devices on said base plate;

said plurality of support devices effective to hydraulically and securely support said workpiece on said base plate during said external operation;

hydraulic pressure means for supplying at least a first hydraulic pressure to said plurality of clamping devices and to said plurality of support devices to enable respective clamping and supporting of said workpiece; and hydraulic booster means for boosting said at least first hydraulic pressure to a boosted hydraulic pressure, and for supplying said boosted hydraulic pressure to and locking said plurality of support devices, whereby said clamping system easily and securely clamps and supports said workpiece and allows speedy removal for later processing.

3. A clamp system, according to claim 2, wherein:

said plurality of clamping devices includes at least one vertically pivoting hydraulic clamp device.

4. A clamp system, according to claim 3, wherein:

said hydraulic pressure means includes at least first oil path means for supplying said first hydraulic pressure downstream to said plurality of support devices.

5. A clamp system, according to claim 4, wherein:

said hydraulic booster means includes at least second oil path means for suppling said boosted hydraulic pressure downstream to said plurality of said support devices; and said hydraulic booster means effective to boost said at least first hydraulic pressure to said boosted hydraulic pressure after said workpiece is securely clamped to said base plate at said first hydraulic pressure, whereby said support devices will not shift said workpiece upon application of said boosted hydraulic pressure.

6. A clamp system, according to claim 5, wherein:

said first oil path means for supplying is in said base plate; and said second oil path means for supplying is in said base plate, wherein said base plate provides easy protection for said first oil path means and said second oil path means and minimizes damage to said hydraulic pressure means and said hydraulic booster means during said external operation.

7. A clamp system, according to claim 5, wherein:

said second oil path means for supplying supplies said boosted hydraulic pressure along a parallel hydraulic circuit.

8. A clamp system, according to claim 4, wherein:

said first oil path means for supplying supplies said first hydraulic pressure downstream to said plurality of support devices along a series hydraulic circuit.

9. A clamp system, according to claim 3, wherein:

said plurality of clamping devices including at least one horizontally pivoting hydraulic clamp device; and said at one vertically pivoting hydraulic clamp device operable in tandem with said at least one horizontally pivoting hydraulic clamp device upon receiving said first hydraulic pressure from said hydraulic pressure means for supplying.

10. A clamp system, according to claim 9, further comprising:

a main cylinder unit in said vertically pivoting hydraulic clamp device;

said main cylinder unit extending perpendicular to said base plate;

a piston rod in said main cylinder unit;

said piston rod extending away from said main cylinder unit when said main cylinder unit receives said first hydraulic pressure in a clamping direction and retracting toward said main cylinder unit when said main cylinder unit receives said first hydraulic pressure in an unclamping direction;

a guide member on said main cylinder unit;

said guide member disengageably fixed to an upper surface of said base plate; and said guide member effective to support said piston rod during said extending and said retracting whereby said guide member protects said piston rod from damage and debris during said external operation.

11. A clamp system, according to claim 10, further comprising:

a rod-side cylinder end wall on main cylinder unit;

said rod-side cylinder end wall integral with guide member;

said piston rod on an output member;

a pivot arm on said output member;

said pivot arm is pivotably supported on a first end of said piston rod;

said pivot arm effective to securely clamp said workpiece to said baseplate during said clamping;

a pivot linking mechanism rotatively linking said pivot arm and said guide member;

a pivot linking member in said pivot linking mechanism; and said pivot linking mechanism vertically pivoting said pivot arm in tandem with said extending and said retracting of said piston rod, whereby said pivot linking mechanism and said pivot arm transmit said first hydraulic force and securely clamp an speedily unclamp said workpiece.

12. A clamp unit, according to claim 9, further comprising:

a second main cylinder unit in said horizontally pivoting hydraulic clamp device;

said second main cylinder unit extending perpendicular to said base plate;

a second piston rod in said second main cylinder unit;

said second piston rod extending away from said second main cylinder unit when said second main cylinder unit receives said first hydraulic pressure in said unclamping direction and retracting toward said second main cylinder unit when said second main cylinder unit receives said first hydraulic pressure in said clamping direction;

a second guide member on said second main cylinder unit;

said second guide member disengageably fixed to an upper surface of said base plate; and said second guide member effective to support said second piston rod during said extending and said retracting whereby said second guide member protects said second piston rod from damage and debris during said external operation.

13. A clamp system, according to claim 12, further comprising:

a second rod-side cylinder end wall on second main cylinder unit;

said second rod-side cylinder end wall integral with second guide member;

said second piston rod on a second output member;

a second pivot arm on said second output member;

said second pivot arm fixably extending from a first end of said second piston rod perpendicular to said second piston rod;

said second pivot arm effective to securely clamp said workpiece to said baseplate during said clamping;

a pivoting mechanism rotatably and extendably linking said second piston rod and said second main cylinder unit; and said pivoting mechanism effective to vertically extend, retract, and pivot said second pivot arm in tandem with said extending and said retracting of said second piston rod, whereby said pivoting linking mechanism transmits said first hydraulic force and securely clamp an speedily unclamps said workpiece.

14. A clamp system, according to claim 13, further comprising:

at least a rod member in said pivoting mechanism;

at least a head-side cylinder end wall in said second main cylinder unit;

said rod member fixably linked at a top side inside a lower section of said second piston rod;

said rod member slidably and rotatably linked at a bottom side to said head-side cylinder end wall;

said rod member including a plurality of helical grooves along an outer circumference of said rod member;

said plurality of helical grooves traveling in an arc about said outer circumference;

said arc between seventy-five and up to ninety degree (75°–90°);

a support member on an upper side of said head-side cylinder end wall;

a plurality of balls rotatably supported and retained in support member; and said plurality of balls engaging respectively each said plurality of helical grooves, whereby when said second piston rod extends and retracts, said rod member rotatably guides said second piston rod and said second pivot arm through said arc to speedily engage and disengage said workpiece.

15. A clamp system, according to claim 14, wherein:

said arc is between ninety and up to one hundred and five degrees (90°–105°).

16. A clamp system, according to claim 9, wherein:

said plurality of support devices includes at least a first vertical support device;

a third main cylinder unit in said first vertical support device;

said third main cylinder unit extending perpendicular to said base plate;

a cylinder cap in said main cylinder unit;

a head-side cylinder end wall secured to said cylinder cap;

said cylinder cap and said head-side cylinder end wall securing said third main cylinder unit in said base plate;

a support member in said vertical support device;

said support member extends perpendicular to said base plate and away from said main cylinder unit;

a third piston rod in said support member;

a support rod extending from an upper end of said third piston rod;

said third main cylinder unit effective to receive said first hydraulic pressure as at least one of a first support pressure and a first unsupporting pressure and respectively extending and retracting said third piston rod according to said first hydraulic pressure;

a third guide member extending away from said base plate;

said third guide member guidably surrounding and supporting said support member during said extension and said retraction, thereby protecting said support member from debris and damage; and means for receiving said boosted hydraulic pressure from said hydraulic booster means and releasably locking said support member against said workpiece relative to said third main cylinder, whereby said workpiece is supported at a pressure greater than said first hydraulic pressure.

17. A clamp system, for disengageably securing a workpiece to a base plate, comprising:

a plurality of clamping devices on said base plate;

said plurality of clamping devices effective to hydraulically clamp said workpiece to said base plate;

a plurality of support devices on said base plate;

said plurality of support devices effective to hydraulically support said workpiece on said base plate;

hydraulic pressure means for supplying at least a first hydraulic pressure through said base plate to each said clamping member and to each said support member; and hydraulic booster means for boosting said at least first hydraulic pressure to a boosted hydraulic pressure, and for supplying said boosted hydraulic pressure through said base plate to and locking said plurality of support devices, whereby said clamping system easily and securely clamps and supports said workpiece and allows speedy removal for later processing.

18. A clamp system, according to claim 17, wherein:

said plurality of clamping devices are vertically pivoting hydraulic clamp devices.

19. A clamp system, according to claim wherein:

said plurality of clamping devices are horizontally pivoting hydraulic clamp devices.

20. A clamp system, for disengageably securing a workpiece to a base plate, comprising:

a plurality of clamping devices on said base plate;

said plurality of clamping devices effective to hydraulically and securely clamp said workpiece to said base plate during an external operation;

said plurality of clamping devices including at least one vertically pivoting hydraulic clamp device;

a plurality of support devices on said base plate;

said plurality of support devices effective to hydraulically and securely support said workpiece on said base plate during said external operation;

hydraulic pressure means for supplying at least a first hydraulic pressure through said base plate to said plurality of clamping devices and to said plurality of support devices; and hydraulic booster means for boosting said at least first hydraulic pressure to a boosted hydraulic pressure, and for supplying said boosted hydraulic pressure through said base plate to and locking said plurality of support devices, whereby said clamping system easily and securely clamps and supports said workpiece and allows speedy removal for later processing.

21. A clamp system, for disengageably securing a workpiece to a bas pate, comprising:

a plurality of clamping devices on said base plate;

said plurality of clamping devices effective to hydraulically and securely clamp said workpiece to said base plate during an external operation;

said plurality of clamping devices including at least one vertically pivoting hydraulic clamp device and at least one horizontally pivoting hydraulic clamp device;

a plurality of support devices on said base plate;

said plurality of support devices effective to hydraulically and securely support said workpiece on said base plate during said external operation;

hydraulic pressure means for supplying at least a first hydraulic pressure to said plurality of clamping devices and to said plurality of support devices; and hydraulic booster means for boosting said at least first hydraulic pressure to a boosted hydraulic pressure, and for supplying said boosted hydraulic pressure to and locking said plurality of support devices, whereby said clamping system easily and securely clamps and supports said workpiece and allows speedy removal for later processing.

22. A clamp system comprising:

a plurality of hydraulic clamp devices on said base plate;

at least a main cylinder unit in each said hydraulic clamp device;

said main cylinder unit disposed in a wall of said base plate;

said main cylinder unit oriented along a first thickness axis of said base plate;

at least an output member in each said hydraulic clamp device;

a piston rod in each said output member extending away from said main cylinder unit;

a guide member disengageably secured to a surface of said base plate;

said guide member effective to guide said piston rod during an extension and a retraction;

said guide member covering at least have of said piston rod projecting away from said surface of said base plate;

a rod-side cylinder end wall on said main cylinder unit;

hydraulic pressure supplying means for supplying at least a first hydraulic pressure to said main cylinder units;

said rod-side cylinder mend wall disengageably secured to said base plate;

at least a first oil path in a wall of said base plate effective supply said first hydraulic pressure from hydraulic pressure supplying means to said main cylinder units, whereby said plurality of clamp devices securely clamp said workpiece to said base plate;

a plurality of support devices;

said plurality of support devices extending away from said base plate;

said plurality of support devices effective to support an external clamped workpiece away from said base plate during an external operation;

each said support device including a second main cylinder unit;

said second main cylinder unit disposed in said wall of said base plate;

said second main cylinder unit oriented along said thickness axis of said base plate;

a second support member in each said plurality of support devices;

said second support member including a second piston rod;

said second piston rod extending from said second main cylinder unit away from said base plate;

a second oil path in said base plate;

said second oil path supplying said first hydraulic pressure from said hydraulic pressure supplying means to each said second main cylinder units of said plurality of support devices; and means for boosting said first hydraulic pressure received said hydraulic pressure supplying means to a second hydraulic pressure;

said means for boosting on said base plate;

said means for boosting increasing including means for supplying said second hydraulic pressure to said plurality of support devices, whereby said plurality of support devices provide increased support to said workpiece.

23. A clamp system, according to claim 22, wherein:

said means for boosting includes at least a second oil path;

said second oil path effective to transport said second hydraulic pressure to said plurality of support devices.

24. A clamp system, according to claim 23, wherein:

said plurality of hydraulic clamp devices includes at least one horizontally pivoting hydraulic clamp device;

a pivoting mechanism in said horizontally pivoting hydraulic clamp device; and said pivoting mechanism effective to pivot said piston rod an a horizontal clearance arc in tandem with a clamping and an unclamping action of said horizontally pivoting clamp device, whereby said workpiece is speedily clamped to said baseplate.

25. A clamp system, according to claim 24, wherein:

said plurality of hydraulic clamp devices includes at least one vertically pivoting hydraulic clamp device;

said vertically pivoting hydraulic clamp device includes at least an output member;

said output member includes a pivot arm having a pivotably supported pivot point;

a pivot point link member operably joined to said guide member;

a pivot point link member supporting said pivot point and said pivot arm; and said pivot point link member and said output ember effective to vertically pivot said output member relative to said base plate in tandem with a clamping and unclamping action of said vertically pivoting hydraulic clamp device, whereby said workpiece is speedily clamped to said baseplate.

26. A clamp system, according to claim 25, wherein:

said at least first oil path includes a first oil path section joining said at least main cylinder units to said hydraulic pressure supplying means;

said first oil path section parallel to a surface of said base plate.

27. A clamp system, according to claim 26, wherein:

said at least first oil path includes at least a first clamping path and a first unclamping path;

said first clamping path effective to supply said first clamping pressure to each said main cylinder unit during a clamping operation;

said first unclamping path effective to release said first clamping pressure from each said main cylinder unit during an unclamping operation, and said first clamping path and said first unclamping path are parallel to each other and separated along an axis perpendicular to a face of said base plate, whereby said plurality of hydraulic clamping devices is easily and simply clamped and unclaimed and said clamping system is simplified to minimize component damage.

* * * * *